Jan. 30, 1973 R. C. QUITTENTON 3,713,840

PROCESS FOR MAKING A BREWERS WORT

Filed July 27, 1970 13 Sheets-Sheet 1

Jan. 30, 1973 R. C. QUITTENTON 3,713,840

PROCESS FOR MAKING A BREWERS WORT

Filed July 27, 1970 13 Sheets-Sheet 4

Jan. 30, 1973 R. C. QUITTENTON 3,713,840

PROCESS FOR MAKING A BREWERS WORT

Filed July 27, 1970 13 Sheets-Sheet 6

PROCESS FOR MAKING A BREWERS WORT

Filed July 27, 1970 13 Sheets-Sheet 8

Jan. 30, 1973 R. C. QUITTENTON 3,713,840

PROCESS FOR MAKING A BREWERS WORT

Filed July 27, 1970 13 Sheets-Sheet 10

Jan. 30, 1973 R. C. QUITTENTON 3,713,840

PROCESS FOR MAKING A BREWERS WORT

Filed July 27, 1970 13 Sheets-Sheet 11

United States Patent Office 3,713,840

Patented Jan. 30, 1973

3,713,840

PROCESS FOR MAKING A BREWERS' WORT

Richard C. Quittenton, Windsor, Ontario, Canada, assignor to John Labatt Limited, London, Ontario, Canada Filed July 27, 1970, Ser. No. 58,630

Claims priority, application Great Britain, July 29, 1969, 38,064/69

Int. Cl. C12c 7/00

U.S. Cl. 99—51 18 Claims

ABSTRACT OF THE DISCLOSURE

This invention provides a process for producing a brewers' wort in which an aqueous slurry of a raw starch-containing material, preferably a cereal grain such as barley, is treated under suitable temperature conditions for defined periods of time with discrete proteolytic, α-amylase and amyloglucosidase enzymes and a β-amylase source or a discrete β-amylase enzyme the proteolytic, α-amylase and amyloglucosidase enzyme being present in amounts of at least about 0.5 modified Kunitz protease units per gm., at least about 45, preferably at least about 100, modified Stein-Fischer α-amylase units per gm. and at least $6.0 \times 10^{-3}$, preferably at least about $1.0 \times 10^{-1}$ amyloglucosidase (AG) units per gm. of starch-containing material respectively. The β-amylase source is conveniently malt present in an amount of no more than about 30% by weight, preferably between about 8% and 20% by weight, so that the traditional reliance upon malt (a relatively expensive and complex material) is greatly lessened. Preferably the mash bill includes up to about 60% by weight, of a cereal adjunct, say, liquefied corn grits. Preferred embodiments of this invention involve novel mash cycles based on defined temperature and time parameters.

This invention also includes a process for producing beer or like non-distilled, alcoholic beverage from such brewers' worts.

BACKGROUND OF THE INVENTION

(a) Field of invention

The present invention relates to the production of a brewers' wort for use in the manufacture of non-distilled alcoholic beverages such as beer, ale, lager, and the like, to an enzyme system for use in obtaining such a brewers' wort and to the conversion of the brewers' wort into such fermented beverages.

(b) Description of the prior art

The production of such beverages normally involves, as is well known, the initial formation of a wort in a mashing process followed by a fermentation process in which fermentable sugars such as maltose present in the wort are converted into alcohol and carbon dioxide. In the brewing of beer, the wort is commonly produced by mashing a slurry of barley malt and adjuncts such as prepared cereals, unmalted raw cereal grains such as corn and rice, or some other carbohydrate source. Unmodified starch-bearing materials such as raw corn grits, should be precooked in a separate cooker before being added to the mash. This is generally done by mixing them with water and finely ground malt, and then boiling the mixture. The malt liquefies the starch material, thereby permitting the subsequent conversion of starch to sugar during the mashing operation.

In the mashing operation itself, the malt, by virtue of enzymes present therein, plays an important role. Thus, α-amylases liquefy the starch material of the grain producing mainly non-fermentable sugars like dextrin, while β-amylases saccharify the liquid starch to fermentable sugars, principally maltose. Further, the proteolytic enzymes break down the high molecular weight proteins to form lower peptides and also significant amounts of amino acids. These decomposition products of proteins not only provide nutrients for the subsequent yeast growth, but also can contribute toward characteristic properties of the beer, for example, foam and haze stability and flavour.

This reliance upon malt which is a feature of present practice, is attended by several significant disadvantages. For instance, the material is relatively expensive because of the high cost of barley of malting quality, the time and cost of converting barley into malt, and especially because of the investment, in both plant equipment and labor associated with its production. Moreover, malt contains husks (8–12%), and typically about 2 to 3% of a viscous, fatty liquid which tend to impart an inferior colour and a bitter taste to the wort. Further, the plant needed for malting tends to be complex and expensive, and requires careful supervision through the various stages by skilled technical personnel.

For some time now, the brewing art has recognized these factors, and proposals have been made to lessen the importance of malt in the manufacture of a brewers' wort. Thus, in the specification of my U.S. Pat. 3,081,172, a brewers' wort is described which is obtained from a mash of raw cereal grains, for example, barley, treated with a commercially available mixture of proteolytic and amylolytic enzymes, in partial or complete replacement of the malt. The mash is held at temperatures at which the added enzymes firstly degrade the protein and then convert the solubilized starch to sugar.

This process, which has been successfully employed in making acceptable beer under actual brewing conditions, offers a very substantial decrease in production costs since unmalted barley or corn, or similar starchy material may be used to supply a high proportion of the carbohydrate needed for fermentation instead of the more costly malted grain. However, it is well-recognized that beer is a complex material with many subtle physio-chemical and organoleptic characteristics such, for example, as colour, foam stability, haze stability, head retention and flavour. Not surprisingly, therefore, in such an enzymatic process, many factors are involved in obtaining a wort and ultimate beer with characteristics akin to those of a conventional malt wort and beer. For instance, particularly important factors influencing wort and beer properties are the activity levels and relative concentrations of the protease and amylase enzymes. Thus, I have found that wort and beer properties are markedly sensitive to variations in protease and amylase levels and relative concentrations, for such variations can adversely affect the necessary balance between nitrogen content and sugar content, and between fermentable and non-fermentable sugars. Unfortunately, as it happens, many commercially available enzyme preparations are not standardized as to activity so that the activity level often fluctuates, occasionally grossly, from one batch to another. Another factor that I have found to have an important bearing on wort and beer properties, is enzyme compatability. Enzymes are proteins and as such can be degraded or inactivated by other enzymes. Since commercially available protease and amylase enzymes involve different systems derived from different sources, compatability is largely unknown and largely uncontrollable. Consequently, it can be difficult to set up a standardized brewing schedule to obtain consistent and reproducible results in the product and obtain a beer of desirable flavour, body, stability, chemical composition, colour, etc., and to be able to adjust different parameters involved in the process to take account of other variable factors.

OBJECTS OF THE INVENTION

This invention is concerned with such an enzymatic treatment of raw starch-containing material to produce a brewers' wort.

An object of this invention is to provide an enzymatic process for the conversion of raw starch-containing material into a brewers' wort of substantially reproducible properties that are generally superior, for instance, a higher fermentable sugar content (increased attenuation) and a higher formol nitrogen content compared to the worts derived from the process of the above mentioned specification.

Another object is to provide an enzymatic process in which the digestion of the starch-containing material can be readily controlled and adjusted to give a brewers' wort of substantially reproducible properties.

These brewers' worts, when subsequently fermented, consistently provide beer with better organoleptic characteristics and other qualities, for example, head and foam retention and haze stability than beer brewed from a wort derived from the process as described in the aforementioned specification.

A further object of this invention, therefore, is to provide a beer with better flavor characteristics and other qualities, for example, head and foam retention and haze stability than beer brewed from wort made according to the process as described in the aforementioned specification.

Other and related objects of this invention will be apparent from the following description and the accompanying drawings in which.

SUMMARY OF THE INVENTION

Figure 1:
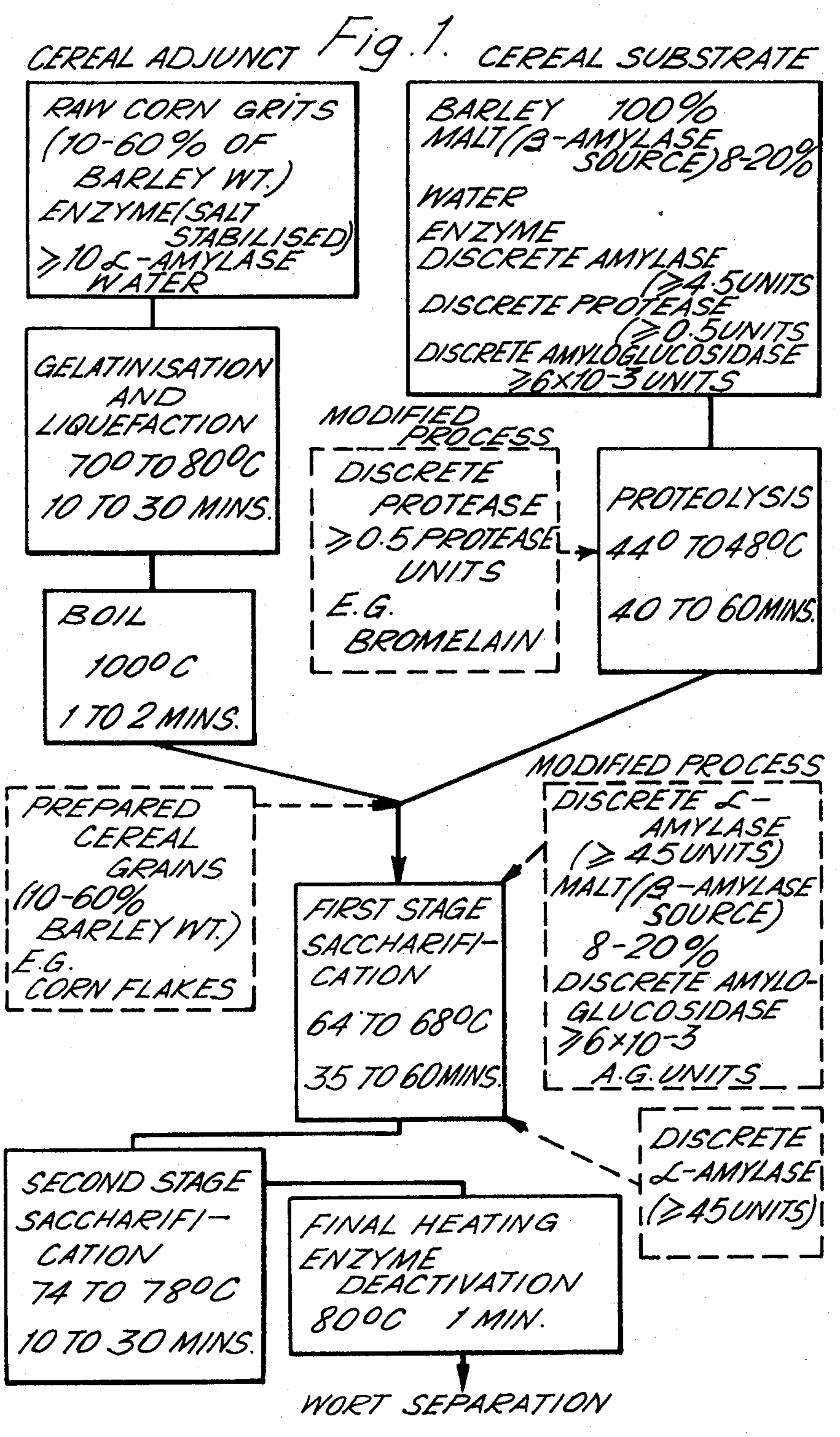
FIGS. 1 to 3 are flow sheets showing the various process steps and their integration in the overall sequence in preferred embodiments according to this invention.

It has now been found according to this invention that the foregoing and related objects can be attained by reacting a slurry of a ground or milled starch-containing material under suitable temperature and time conditions with a discrete proteolytic enzyme, a discrete α-amylase enzyme, a discrete amyloglucosidase enzyme and a β-amylose source or a discrete β-amylase enzyme, said proteolytic, α-amylase and amyloglucosidase enzymes being present in amounts of at least 0.5 modified Kunitz protease units per gm., at least about 45, preferably at least about 100 modified Stein-Fischer α-amylase units per gm. and at least $6.0\times10^{-3}$, preferably at least about $1.0\times10^{-1}$ amyloglucosidase (AG) units per gm. of starch-containing material respectively. Throughout this specification, unless the context otherwise requires, the enzyme levels quoted are based upon the weight of unmalted starch-containing material present in the slurry.

Advantageously in this process, an aqueous slurry of cereal grains, for example, ground barley, wheat or corn is treated with up to about 30% by weight malt, or malt extract as the β-amylase source preferably between about 8% and about 20%, at least about 0.9, preferably between about 0.9 and about 2 to 2.5 modified Kunitz protease units per gm., at least about 100 modified Stein-Fischer α-amylase units per gm. and at least about $1\times10^{-1}$, preferably between about $1\times10^{-1}$ and $10\times10^{-1}$ amyloglucosidase units per gm.

In preferred procedures according to this invention, a cereal adjunct is introduced into the aqueous cereal grain slurry at a convenient stage. This cereal adjunct may take the form of a liquefied mass of unmodified starch-bearing cereal grains such as corn grits, corn meal, rice flour, wheat flour, barley flour, sorghum corn and the like which have been precooked in a separate vessel. Alternatively, it may take the form of prepared starch-bearing material such, for example, as corn flakes, corn starch, glucose and the like. Preferably, the cereal adjunct is introduced in an amount of between about 10 and about 60%, more preferably between about 42 and about 55%, by weight based on the weight of the adjunct cereal grains relative to the weight of cereal grain substrate in the aqueous slurry.

DEFINITIONS

The expression "discrete enzyme" as used herein in relation to the protease, α-amylase, amyloglucosidase and β-amylase enzymes refers to an enzyme derived from a plant, bacterial or fungal source, and which has been extracted and purified on an industrial scale, and which manifests a significant protease, α-amylase, amyloglucosidase and/or β-amylase activity as the case may be. Other enzymes, aside from these particular four enzymes may also be present such, for example, as cellulases, hemicellulases and pectinases. Further a discrete enzyme mixture containing significant amounts of two (especially the protease and amylase), three or all four enzymes may be used in the process of this invention. Alternatively, the components may be derived from different sources, in which event, the resulting enzymes are mixed together to give the desired activity levels of the three enzymes. The enzyme or enzyme mixture may be used, for example, in the form of a solution or admixed or supported on a solid carrier.

The determination of the activity of the various enzyme systems to which reference is made at various passages throughout the specification and claims, is made by specific biochemical assays as follows:

Protease

The protease activity is measured by determining with Folins-Ciocalteau reagent (available from Fischer Scientific as So-p-24 Phenol Reagent Solution 2 N) the amount of trichloroacetic acid (TCA)-soluble tyrosine liberated from a casein substrate under specific conditions of pH, temperature and time. The method employed is essentially that described by Kunitz, Journal of General Physiology, 30, 291, 1947 modified in the following respects:

2% casein in 0.066 M phosphate buffer—pH 7.0;
2 mls. enzyme and 2 mls. substrate are used in the enzyme reaction;
Enzyme reaction time is 10 minutes at 37° C.;
Precipitation is achieved with 4 mls. 0.4 M TCA; and
The precipitated protein is separated using Whatman No. 42 filter paper.

In this assay, a protease unit is the amount of enzyme necessary to produce 1 microequivalent of TCA-soluble tyrosine in one minute under the conditions of the assay.

α-Amylase

This activity is measured by determining with 3,5-dinitrosalicylic acid the amount of reducing sugars (maltose) formed from solubilized starch under specific conditions of pH, temperature and time. The method employed is essentially that described by Stein and Fischer, Journal of Biological Chemistry, 232, 869, 1958 modified in the following respects:

Merck soluble starch according to Lintner is used;
1% starch, as substrate, is made up in distilled water;
Enzyme diluted in 0.05 M acetate buffer—pH 6.0;
Incubation is at 37° C. for 5 minutes; and
Reaction mixture is diluted with 10 ml. water.

In this assay, an α-amylase unit is the amount of enzyme necessary to produce 1 microequivalent of maltose in one minute under the conditions of the assay.

Amyloglucosidase

The activity of a particular amyloglucosidase enzyme is determined by measuring using the Schoorl reducing sugar estimation the amount of dextrose formed from solubilised corn starch under specified conditions of temperature and time following the assay procedure outlined in Miles Laboratories Inc. Technical Bulletin No. 2–122, p. 21, 1962. In this assay, an amyloglucosidase (glucoamylase) unit is the amount of enzyme required to form 1 g. dextrose from 4 g. starch substrate in 1 hour at 60° C.

β-Amylase (saccharifying enzyme)

The activity of a β-amylase, usually malt, is expressed in terms of its diastatic power in degrees Lintner based on the conversion of soluble starch into maltose following the standard procedure described at A.S.B.C. Methods, Section Malt–6.

Further features relating to the various materials used in the process, the function thereof and preferred ways of carrying out the process will now be further described.

DETAILED DESCRIPTION OF THE INVENTION

MATERIALS AND THEIR FUNCTIONS

Starch-containing material

Although starch-containing materials other than cereal grains, such for example, as buckwheat, may be used, grains such as degermed corn, rye, rice, wheat, barley or mixtures thereof are preferably used as the substrate. Barley is the preferred cereal substrate as its digestion products after enzymatic attack most closely correspond to the nitrogen and carbohydrate spectra of a conventional brewers' wort derived from malt. In addition, barley starch is gelatinised at relatively low temperatures, thus permitting its rapid degradation before appreciable heat deactivation of the amylases occurs. Further, the barley enzymes, such as β-amylase, which are released and activated during the process are believed to play an important role in producing fermentable sugars. I have found that the grain size markedly influences the enzymatic process. Thus, generally speaking, the finer the grain size, the less enzyme is required for digestion, but the more difficult the subsequent filtration and sparging using conventional brewery mash or lauter filters. Consequently, a system based on fine cereal grains tends to involve low enzyme concentration but high filtration costs. On the other hand, coarser grains, though easier to filter using conventional filter equipment, usually demand a high enzyme concentration. In practice, I have found that a satsfactory compromise between enzyme concentration and amenability of the wort to subsequent filtration on standard filtration equipment may be attained by grinding the grains to a particle size such that the bulk of the particles pass through a No. 14 Screen (U.S. Standard Sives), i.e. have an average particle size of less than 1.41 mm. If desired, the cereal grains, such as barley, may be heated, for instance, to between 120° and 170° F., or treated with suitable chemicals, before slurrying.

ENZYMES (1) Protease

The discrete protease enzyme may be derived from a bacterial, fungal, plant or animal source, though bacterial proteases are preferred. Bacterial proteases may, for example, be derived from any of:

*Bacillus subtilis; Bacillus amyloliquefaciens; Bacillus polymyxa; Bacillus megaterium* and *Bacillus cereus.*

Fungal proteases may, for example, be derived from any of:

*Aspergillus niger; Aspergillus oryzae; Aspergillus tamarii;* and Rhizopus sp.

The plant or animal protease may, for example, be pepsin, papain, trypsin, bromelain, ficin or pancreatin; many of which proteases are readily available commercially. I have found that it is desirable for the protease enzyme to include both neutral and alkaline protease components for this is usually advantageous in promoting digestion of the starch and solubilization of the grain protein with the release of small chain peptides and the obtention of a satisfactory spectrum of amino acids (it is believed that the two types of proteases, which display optimum activty at different pH values, are responsible for the release of different types of amino acids).

The protease enzyme under suitable conditions serves to convert high molecular weight proteins in the starch of the cereal grains to soluble nitrogen containing compounds such as peptides and amino acids. These decomposition products of proteins not only provide nutrients for the subsequent yeast growth, but also contribute toward characteristic properties of the beer, for example, foam, and a smooth mellow palate.

(2) α-Amylase

The discrete α-amylase enzyme may be derived from a fungal or bacterial source as, for example, from any one of *Bacillus subtilis, Bacillus amyloliquefaciens, Bacillus coagulans, Bacillus polymyxa, Bacillus megaterium, Bacillus cereus, Aspergillus oryzae, Aspergillus niger* and Rhizopus sp.

The α-amylase enzymes under suitable conditions are usually highly active in digesting the starch by acting upon, and breaking down, amylose and amylopectin polymers of which starch is composed. The former is an unbranched polysaccharide consistng of long chains of α-(1→4) linked glucose units, and the latter a branched polysaccharide polymer consisting of short chains of α-(1→4) glucose units joined in the (1→6) position to form a large molecule. The α-amylase enzyme randomly hydrolyses α-D-(1→4) linkages in amylose and amylopectin molecules, but does not attack (1→6) linkages. Consequently, α-amylases effect a rapid fragmentaton of starch with the production first of branched oligosaccharides of medium molecular weight and, later, of branched limit dextrins. The final products of starch digestion are a large amount of limit dextrins and smaller amounts of glucose and maltose. The primary effect of the α-amylase induced fragmentation is to solubilise, i.e. liquefy, the starch so facilitating contact between the cereal grains and the other enzymes.

(3) Protease and α-amylase mixture

With a suitable bacterial species, and using appropriate fermentation conditions, an enzyme mixture comprising a complex of extracellular protease and α-amylase enzymes may be isolated. The specification of commonly assigned co-pending application No. 52,999, filed on July 7, 1970. describes the preparation of such an enzyme complex by fermentation using a bacterium of the genus Bacillus, conveniently a new strain of *Bacillus subtilis* designated ATCC 21556. Since this process can be readily controlled to give the protease and amylase enzymes in good yields and at concentration levels convenient for the subsequent enzymatic conversion process, such an enzyme complex is an advantageous source of protease and amylase enzymes. The enzyme complex may be used in the form of the fermentation broth, which optionally may be concentrated, say by evaporation. Alternatively, the enzyme complex may be used in solid form, preferably in conjunction with a carrier, for instance, in the form of a spray dried broth or as a precipitated solid blended with an inert carrier such as starch, gypsum, diatomaceous earth or the like.

(4) Amyloglucosidase

The amyloglucosidase enzyme, also known as glucoamylase or limit dextrinase, hydrolyses and splits $\alpha$-D-$(1\rightarrow4)$ and $\alpha$-D-$(1\rightarrow6)$ linkages in the starch oligosaccharides with the removal of successive glucose units from the non-reducing ends of the oligosaccharide chains. The primary effect of the amyloglucosidase enzyme is to convert carbohydrate material into the fermentable sugar dextrose. The specific action of this enzyme in hydrolysing $(1\rightarrow4)$ and $(1\rightarrow6)$ linkages with the production of the fermentable sugar dextrose reinforces the action of the amylases, especially the saccharifying amylase, usually a $\beta$-amylase, in producing such sugars from the oligosaccharides. This effect of the amyloglucosidase enzyme is reflected in a higher fermentable sugar content, i.e. higher apparent attenuation, in the wort and, accordingly, a higher alcohol content, in the finished beer.

The discrete amyloglucosidase enzyme may be derived from a fungal source such, for example, as: *Aspergillus niger; Aspergillus awamori; Aspergillus oryzae; Rhizopus javanicus; Rhizopus niyveus;* Endomyces sp.

This enzyme may be employed in a substantially pure form, or in the form of an amyloglucosidase-containing preparation such as the fermentation broth from an amyloglucosidase producing fungal source.

(5) $\beta$-Amylase

The $\beta$-amylase may be derived from various plant sources such, for example, as barley, soybeans and sweet potato, employing standard extraction techniques, or from fungal sources. Advantageously, a ground malt or malt extract is used as the source of $\beta$-amylase, for it is found that the use of malt, especially barley malt, inheres with the additional advantage of assisting in imparting characteristic flavour factors to the wort and to the beer derived therefrom, and is also thought to promote stability. Further, malt has $\alpha$-amylase as well as limit dextrinase activity. These enzymes are made available during processing and assist in decomposing the grain converting it into wort. Whilst the malt may be present in an amount of up to 30% by weight, I have found that between about 8% and about 20%, say, between about 8% and 12%, by weight gives optimum results consistent with the desideratum of a low malt content. Conveniently, the malt employed is a barley malt with a diastatic activity of between about 50° and 140°, typically 100° and 140° Lintner. Normally, the malt is employed in ground form, preferably with a particle size such that about 70% or more passes through a No. 14 Screen (United States Standard Sieves).

The $\beta$-amylase enzyme, or source thereof, under suitable conditions, attacks at the non-reducing ends of the amylose and amylopectin chains in the starch, and proceeds by step-wise removal of maltose units. An inversion of the D-glucosidic linkage occurs, and the maltose liberated is of the $\beta$-configuration. Amylose with an even number of D-glucose units is converted completely to maltose while amylose with an odd number of units is converted to maltose and maltotriose which contains the reducing D-glucose unit of the original amylose chain. Amylopectin is hydrolysed like amylose beginning at the non-reducing ends of the outer chains, though $(1\rightarrow6)$ linkages present in the amylopectin are not attacked by the amylase and remain as residual or branched-limit dextrins The main effect of the $\beta$-amylase attack is to produce reducing sugars, principally maltose, which are available for subsequent conversion, in the fermentation process, to alcohol.

Calcium ions usually increase the resistance of these enzymes to deactivation by heat and, accordingly, to promote enzyme stability during the process, a calcium salt, say calcium carbonate, or chloride, is often included along with the enzyme(s) or added to the water in cases where the calcium hardness of the water falls much below 200 p.p.m.

(6) Enzyme levels

Regardless of whether the protease $\alpha$-amylase and amyloglucosidase enzymes are used in the conversion process separately or together in the form of an enzyme mixture the consistent improvement in wort and beer properties associated with this invention requires that the protease should be present at an enzymatic level of 0.5 or more, preferably at least 0.9, protease units per gm. of cereal grain substrate.

At protease levels of less than 0.5 unit per gm. there is inadequate protein solubilization of the cereal grains inhering with a poor breakdown of the high molecular weight proteins and a poor release of bound carbohydrates from the starch granules. The net result is that the wort so-obtained has a reduced content of soluble nitrogen-containing compounds like amino acids, and small peptides and a reduced content of carbohydrates such as fermentable sugars as reflected in the Quick Fermentation test (Q.F.—determined by the Fermentable Extract procedure set forth in A.O.A.C. Methods 10.120(b) and attenuation data. I have found that these effects often show up in the finished beer which tends to have a low nitrogen content, which can cause flavour and other problems, and a reduced alcohol content. Further, with a protease level below 0.5 unit per gm. the mash is difficult to filter and protracted lautering times are needed using standard brewery equipment. Apart from a minimum activity level, the experimental evidence indicates that there exists a maximum protease level compatible with a desired degree of protein solubilization and the obtention of a satisfactory brewers' wort and good beer, at around about 2 to 2.5 protease units per gm. At protease levels much in excess of 2 to 2.5 protease units per gm. the total nitrogen content in the resulting wort, at around 1000 to 1400 mg./litre, is so high that the finished beer has poor haze and foam stability as well as an unappealing "flat" flavour. Further, at protease levels in excess of 2 to 2.5 there is no material improvement in yield and attenuation values over the values obtained at lower protease levels.

At amylase levels of less than about 45 amylase units per gm. of starch-containing material, I find a marked reduction in starch degradation. This is reflected in a decrease in the gravity and soluble carbohydrate, such as fermentable sugar, content so that the resulting wort has a diminished extract value (lower ° P) and fermentability (Q.F.), and the beer obtained from such a wort has a reduced alcohol content. There is also an adverse effect on flavour and stability. The experimental data indicates an optimum amylase level, at around 100 amylase units per gm. compatible with the obtention of a satisfactory brewers' wort and a good beer in an economically favourable process.

So far as the amylglucosidase enzyme is concerned, at levels less than about $6\times10^{-3}$ A.G. units per gm., there is no noticeable improvement in wort characteristics as reflected in fermentability (Q.F.), an attenuation. For substantial improvement in wort properties it is desirable for the amyloglucosidase to be present in an amount of $1\times10^{-1}$ A.G. units per gm. for this level usually improves the Q.F. by the order of 0.3 to 0.4 unit and the attenuation by the order of 1 to 2%, which the brewer will recognize as significant. The experimental evidence indicates that the most pronounced improvement in wort properties is obtained with an amyloglucosidase level of between about $2\times10^{-1}$ and about $10\times10^{-1}$ A.G. units per gm., typically around .50 A.G. unit per gm. With increasing amyloglucosidase levels above 1.0 A.G. unit per gm. the improvement obtained in wort properties is much less than would be expected from the amount of enzyme actually present, and there is a tendency for the resulting beer to have a "thin," watery taste (i.e. lacks body). Accordingly, especially in view of the relatively high cost of such enzymes, it is advantageous to work at amyloglucosidase levels less than about 1.0 A.G. unit per gm.

Process

The enzymatic treatment of the cereal grains, typically barley, with the four enzyme systems involved, may be effected in a variety of ways, differing, for instance, in the sequence of enzyme addition, and in the temperature and time relationships with regard to a particular enzyme activity. Common to the different procedures for practising this invention is the initial formation of an aqueous slurry of the starch-containing material, say the barley.

The barley (or other cereal grain) preferably is present in the slurry at a concentration of between about 20 and about 40 gms. per 100 cc. water (ratio≡1:2.5 to 1:5), more preferably about 28 gms. to 33 gms. per 100 cc. water (ratio≡1:3.0 to 1:3.5). Preferably, the hardness of the slurry water is between 20 and 35 equivalent parts by weight of Ca and Mg carbonates per 1,000,000 parts by weight of water; if the hardness is less than about 20 p.p.m. then calcium carbonate or some other calcium salt may be added to increase the hardness. The addition of calcium ions, in the form of a salt, at this stage for the purpose (aside from increasing the hardness) of enhancing the heat stability of the enzymes offers a convenient alternative to their incorporation at another stage, for instance, during enzyme preparation. The pH of the water is adjusted to between about 5.0 and 6.5, preferably between about 5.2 and about 5.8. Usually the pH remains essentially the same throughout the process. Should the pH be outside the broad range recited the enzymic conversion is not as effective.

(A) In this procedure as summarised in the flow sheet of FIG. 1 in the accompanying drawings, all of the enzymes are added, in an initial step, to the aqueous slurry of barley grains at a pH of between about 5.0 and about 6.5. The enzymes may be added simultaneously, say, in the form of an enzyme blend, or consecutively. Thereafter, the enzymes are thoroughly dispersed in the slurry by vigorous agitating. The enzyme-containing slurry is then heated at about 40° to about 55° C., preferably at about 44° to about 50° C., for a period of between about 30 and about 240 minutes, usually between about 30 and about 120 minutes and preferably between about 40 and about 60 minutes. While heating, it is desirable to agitate the slurry vigorously, as by stirring, to ensure intimate contact between the barley substrate and the enzyme(s). Heating within this temperature range for this period permits both proteolysis of the grain protein by the proteases, and digestion of the barley grain by barley enzyme systems.

The proteolytic reaction is directly reflected in the total nitrogen content as well as the α-amino acid content (formol nitrogen) of the wort. Generally, in conventional worts, a total nitrogen content of at least about 750 to 950 mg./litre and a formol nitrogen content of at least 200 to 250 mg./litre are considered satisfactory through these values can vary widely depending on the kind of beer being made. I have found that, with the protease enzyme present in the amount of at least 0.5 protease unit per gm., perferably 0.9 protease unit or more, and with the temperature held at between about 44° and about 50° C., these levels can be attained in the surprisingly short time of around 45 to 60 minutes, and little is to be gained by prolonging the proteolytic reaction time beyond this.

At the end of the proteolysis, the temperature of the slurry is raised to between about 60° and about 80°, preferably about 64° and about 80° C. When such a temperature is attained, the slurry is held at a temperature within this range for a period of about 30 to about 120 minutes.

During this period, the liquefying α-amylase enzyme is highly active insolubilising the starch by breaking down amylose and amylopectin polymers of which the starch of the cereal grains is composed. Also, during this period, the amyloglucosidase and β-amylase enzymes act upon the starch chains to produce fermentable sugars. The net effect of the α-amylase enzyme is to liquefy or solubilise the starch with the production of non-fermentable dextrins, while the net effect of both the β-amylase and the amyloglucosidase is to produce reducing, fermentable sugars such as maltose and dextrose.

Not only does the α-amylase have a different mode of action from the β-amylase and the amyloglucosidase, but they display optimal activity at different temperatures. The optimal temperature will vary depending, for instance, upon the enzyme source. Normally, however, bacterial α-amylases, heat-stabilised by calcium ions, have an optimal temperature between about 70° and 80° C. In comparison, amyloglucosidases, for instance, the amyloglucosidase from *Aspergillus niger*, and β-amylases, for instance, the β-amylase from barley malt, have an optimal temperature at between about 55° and about 60° C. In other words, the α-amylase usually displays maximum activity at higher temperatures than the β-amylase or amyloglucosidase.

Against this background of facts concerning the mode of action of α-amylases, amyloglucosidases and β-amylases and their temperature requirements, and as a result of detailed experimental investigation, I have derived, for this process step, a preferred temperature/time relationship. This is based on a two-stage heating procedure. Such a step-wise temperature profile usually gives better yields and higher fermentable sugar contents (increased apparent attenuation) in the resulting wort compared with the wort obtained when a substantially steady temperature is maintained during this period.

Figure 6:
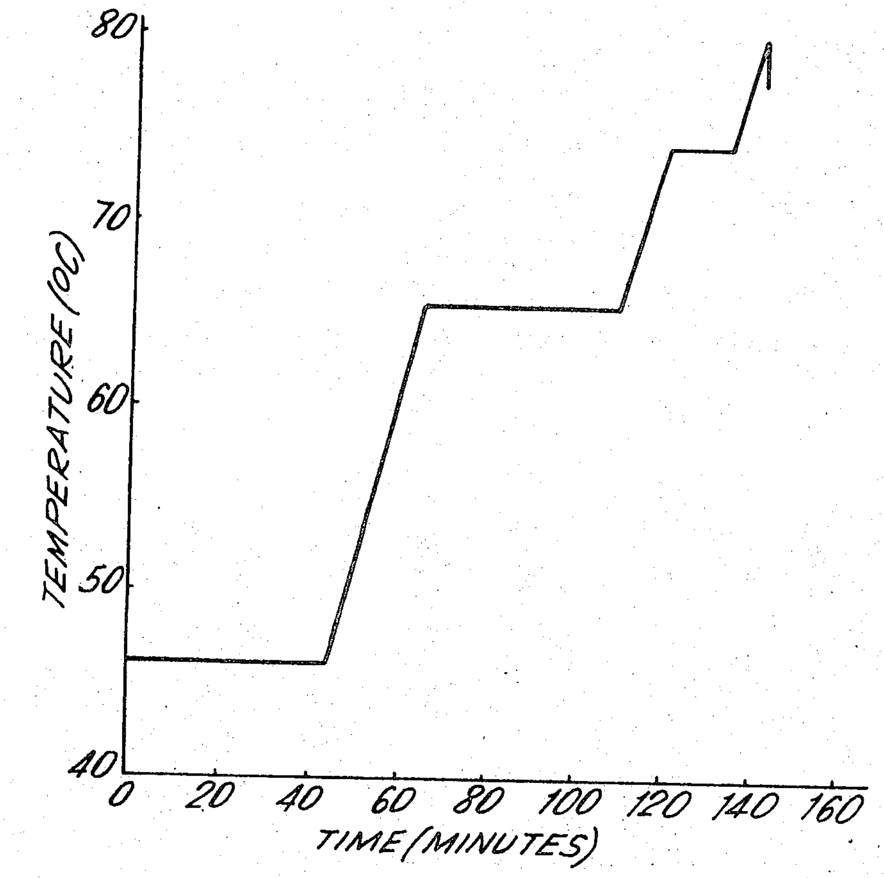

In this step-wise procedure, the combined mass is initially held at a temperature of between about 60° and about 70° C. for between about 30 and about 90, preferably between about 30 and 60, minutes. It is then raised to between about 70° and about 80° C. and held at this higher temperature for between about 10 and about 60, preferably between about 10 and about 30, minutes. The first stage temperature of 60° to 70° C., preferably 64° to 68° C., is intermediate the optimum for α-amylase activity, on the one hand, and amyloglucosidase and β-amylase activities on the other hand, but is still below the temperature at which the amyloglucosidase and β-amylase are substantially deactivated. Consequently, in this first stage, α-amylase, amyloglucosidase and β-amylase activity proceeds at a fairly fast rate, through less than the optimum. The concerted action both solubilises starch, with the concomitant production of non-fermentable sugars, and saccharifies it with the production of fermentable sugars. In many instances, I find that it is not necessary to hold for more than about 60 minutes at this temperature to give a fermentable sugar content at, or close to, an acceptable level as indicated by an apparent attenuation of about 75%. However, at the end of this period, the yield, which indicates the effectiveness of the starch conversion and is measured by gravity determination, tends to be on the low side. In the second stage, with the temperature at between about 70° and about 80° C., preferably 75° to 80° C., the α-amylase activity is at, or around, optimum so that starch solubilisation proceeds rapidly thereby improving the yield. At the same time, since there has already been considerable fragmentation of the starch chains in the preceding step, giving many more intermediate or low molecular weight molecules with many more ends at which the β-amylase can act quickly, the α-amylase in this step tends to produce a higher concentration of fermentable sugars than might be expected. Consequently, the increase in yield can be attained without any marked, if any, reduction in the ratio of fermentable to non-fermentable sugars. The temperature/time profile in the preferred mash cycle for this procedure is shown in FIG. 6 of the accompanying drawings.

This particular procedure may be modified by delaying the malt addition until after the inclusion of the cereal adjunct (liquid or solid) and, with this modification, the discrete enzyme mixture used in the first stage may be replaced by a discrete protease enzyme alone, for instance, bromelain, ficin, pepsin or papain, and a discrete α-amylase enzyme added, say, along with the malt, and the amyloglucosidase after inclusion of the cereal adjunct if these are not included in the first stage.

In another modification of this particular procedure the discrete enzyme mixture used in the first stage is replaced by a discrete protease enzyme, for instance, bromelain, ficin, pepsin or papain at a level of at least 0.5, preferably at least 0.9, unit per gm. and the α-amylase enzyme, optionally along with the amyloglucosidase enzyme, is added to the combined mash following the inclusion of the cereal adjunct (liquid or solid). The α-amylase enzyme may be added in the form of a discrete α-amylase enzyme alone, or as a component of discrete enzyme mixture that also contains a protease enzyme, conveniently the enzyme complex derived from a *Bacillus subtilis* strain.

Figure 2:
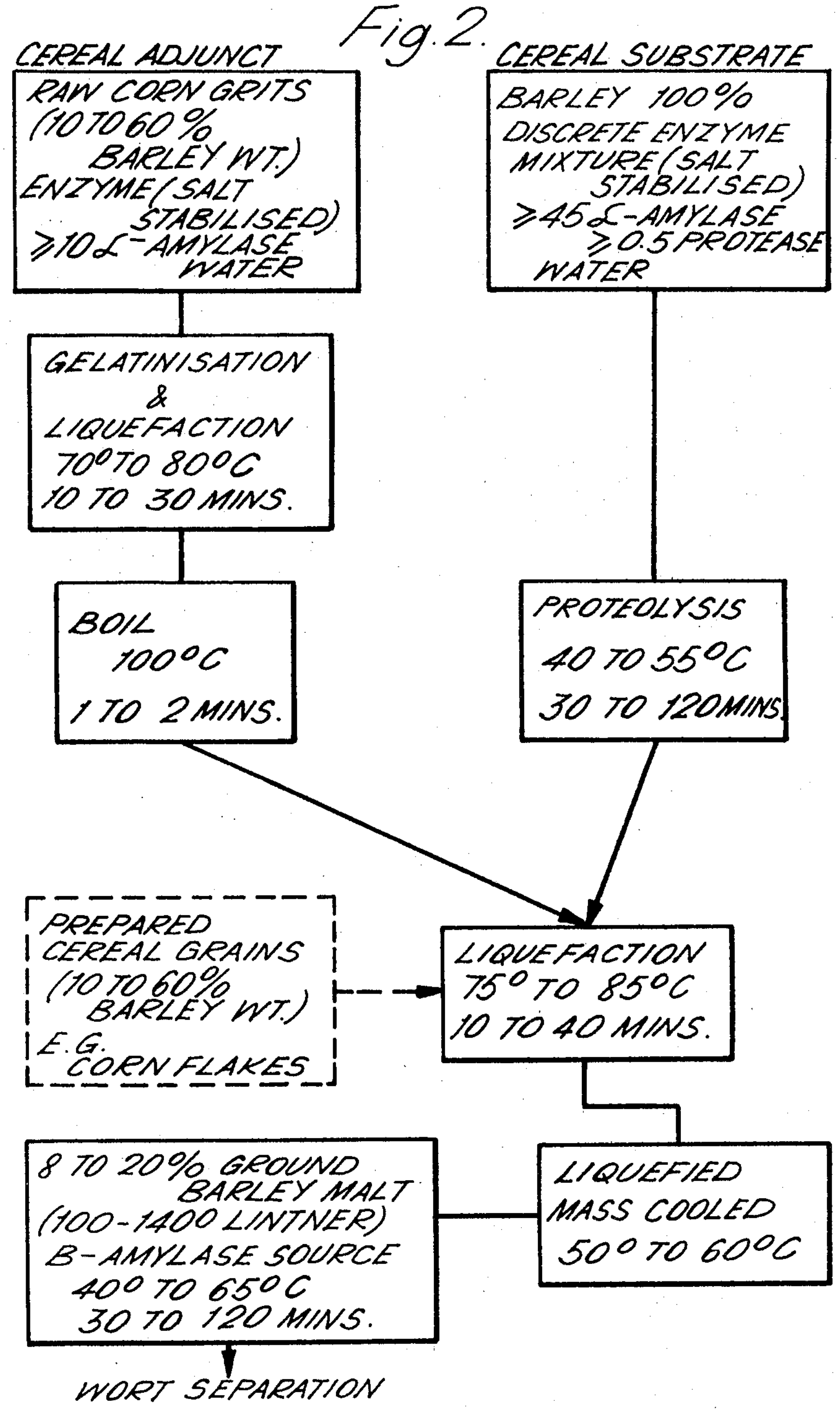

(B) In this procedure, as summarised in the flow sheet of FIG. 2 of the accompanying drawings, the proteolytic enzyme is added in an initial step, optionally in combination, for instance, as a discrete enzymatic mixture, with the α-amylase enzyme. The aqueous slurry is then heated at about 40° to about 55° C., preferably at about 44° to about 50° C., for between about 30 and about 240 minutes, usually between 30 and 120 minutes and preferably about 40 minutes to about 60 minutes, to effect proteolysis. While heating, it is desirable to agitate the slurry vigorously, as by stirring, to ensure intimate contact between the barley substrate and the enzyme(s).

If an α-amylase enzyme is not included in the initial step, it is added at, or toward the end of the proteolysis step.

With the α-amylase enzyme present in the slurry, the temperature thereof is raised, for instance, by direct steam injection or passage through a suitable heat exchanger, to between about 65° and about 90° C., preferably between about 70° and about 85° C.

At such a temperature, the α-amylase is highly active in digesting the starch by acting upon, and breaking down, amylose and amylopectin polymers of which starch is composed. The final products of the starch digestion by the α-amylase are a large amount of limit dextrins and smaller amounts of glucose and maltose. The net effect of the α-amylase induced fragmentation is to solubilise, i.e. liquefy, the starch, so facilitating physical contact between the cereal grains and the saccharifying β-amylase enzyme subsequently to be incorporated.

The slurry is held within this temperature range until the starch has been adequately solubilised and the viscosity reduced to the appropriate level. Usually between about 10 and about 90 minutes, more commonly between about 10 and about 40 minutes at such a temperature results in an adequate degree of solubilisation. Generally speaking, the higher the temperature within range, the shorter the period needed to give the desired degree of solubilisation. During this period, the temperature may be varied within the range, for instance, it may be raised incrementally.

At the conclusion of the previous step, the liquefied mash is cooled, for instance, by passage through a heat exchanger or simply by standing in a reaction vessel, to between about 40° and 65° C., preferably between about 50° and 60° C., and the discrete amyloglucosidase enzyme and the β-amylase enzyme or source thereof, added simultaneously or consecutively (in either sequence) and dispersed therein by vigorous stirring. The amyloglucosidase and β-amylase in intimate contact with the starch, attack at the non-reducing ends of the remaining amylose and amylopectin chains, as well as the breakdown products of the previous α-amylase attack, and proceed by step-wise removal of maltose units with the production of fermentable sugars. The amyloglucosidase enzyme attacks the (1→4) and (1→6) linkages in the products, e.g. limit dextrins, of the preceding α-amylase attack, with the production of more fermentable sugars in the form of dextrose. Since there has already been considerable fragmentation of the starch chains in the preceding step involving α-amylase, giving many more intermediate or low molecular weight molecules with many more ends at which the β-amylase can act quickly and a high content of limit dextrins, the rate of fermentable sugar formation in this step is fairly rapid, and a high degree of conversion is attained.

The residence time in this temperature range needed to produce an acceptable fermentable sugar content varies depending, for instance, on the quantity and activity of the amyloglucosidase and β-amylase (usually malt) enzymes. Usually, with 8 to 20% malt of the preferred diastatic activity of between 100° and 140° Lintner and with the amyloglucosidase enzyme present at an activity level of $1.0\times10^{-1}$ or more, a residence time of between 30 and 120 minutes is satisfactory.

Figure 3:
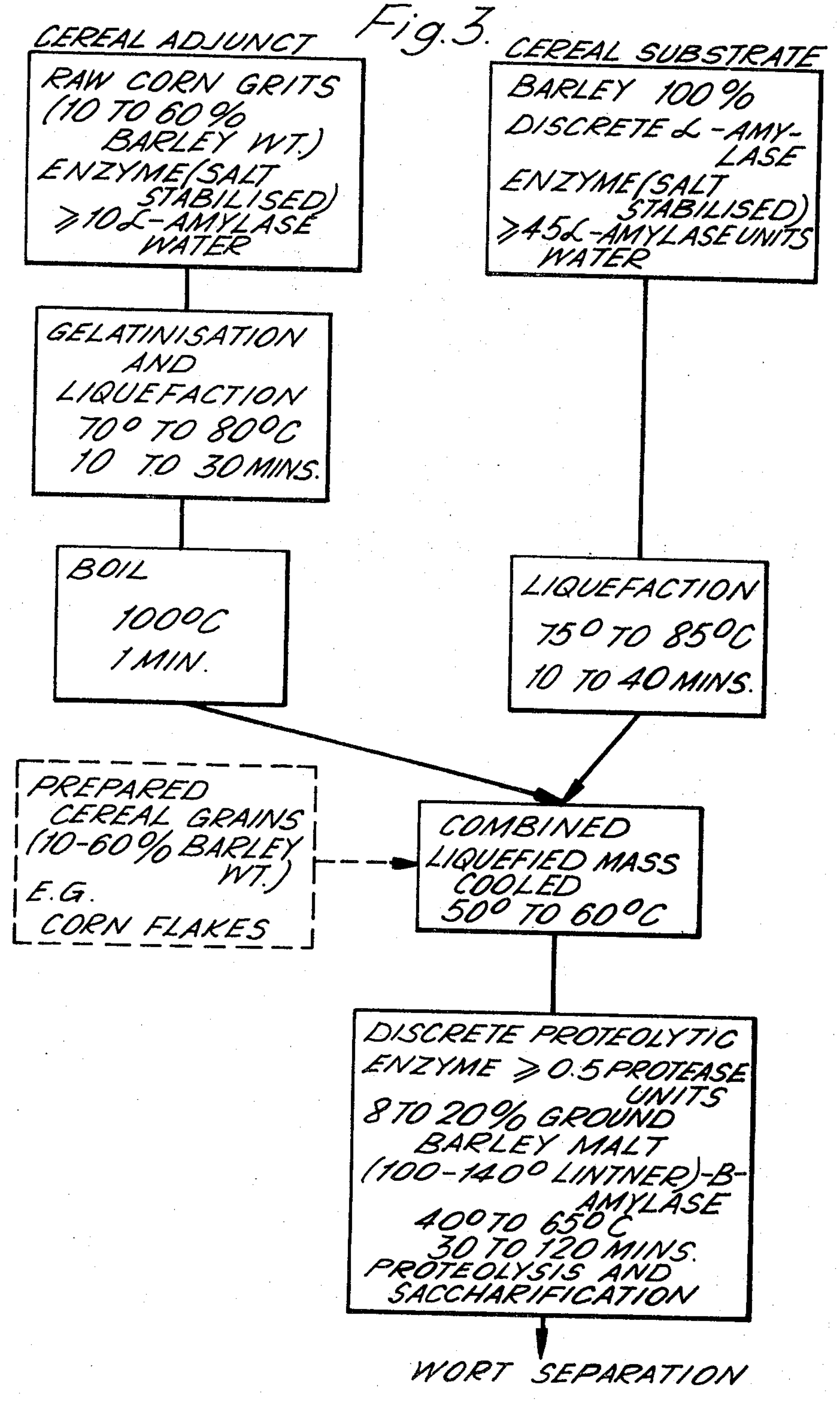

(C) This procedure, as summarised in the flow sheet of FIG. 3 of the accompanying drawings, is a modification of the foregoing procedure B, in which the initial step is the high temperature liquefaction involving α-amylase. In this procedure, the α-amylase enzyme is added to, and thoroughly dispersed in, the aqueous slurry of barley grains. Thereafter, the temperature is raised, for instance, by passage of the slurry through a heat exchanger or in a stirred tank reactor, to between about 65° and about 90° C., preferably between about 70° and about 85° C.

The slurry is held within this temperature range, desirably with continuous agitation, until the starch has been adequately solubilised and the viscosity reduced to the appropriate level. Usually between about 10 and about 90 minutes, more commonly between about 10 and about 40 minutes, at such a temperature results in an adequate degree of solubilisation. Generally speaking, the higher the temperature, the shorter the period needed to give the desired degree of solubilisation. During this period, the temperature may be varied within the range, for instance, it may be raised incrementally.

At the conclusion of the previous step, the liquefied mash is cooled to between about 40° and 65° C., preferably between about 50° and 60° C., by passage through a heat exchanger or in a coiled or jacketed stirred tank reactor. Thereafter, the discrete protease and amyloglucosidase enzymes, and the β-amylase or source thereof are added, at the required activity levels, and thoroughly dispersed in the mash by vigorous agitation. These enzymes may be added simultaneously, for instance, in the form of a blend, or they may be added consecutively in either sequence without pause or after an interval of, for instance, about 15 minutes. If desired, the pH of the medium in this stage may be adjusted to between about 5 and about 6.5, preferably between about 5 and about 6.

During this period, the protease converts the protein into soluble nitrogen-containing compounds thereby providing nutrients for the subsequent yeast growth, and contributing toward characteristic properties of the beer, for example, foam and haze stability, and a smooth mellow palate. Again, the amyloglucosidase and the β-amylase (usually malt) act upon the remaining starch and the α-amylase reaction products to produce fermentable sugars.

The residence time in this temperature range needed to produce an acceptable soluble nitrogen content and fermentable sugar content again varies depending, for instance, on the quantity and activity levels of the protease and malt. Usually, with the protease at an enzymatic level of 0.5 protease unit per gm. or more, the amyloglucosidase at an enzymatic level of $1.0\times10^{-1}$ or more per gm., and with 8 to 20% of malt of the preferred diastatic value of between 100° and 140° Lintner, a residence time of between 30 and 240 minutes, preferably between 30 and 120 minutes, is satisfactory.

At the conclusion of each of procedures A to C, the temperature of the mash is usually raised for a brief period, for instance, 2 to 5 minutes, to over 80° to 90° C. to inactivate the enzymes. Thereafter, the mash is run-off, conveniently into a conventional brewery lauter tun or mash filter so as to separate the wort from the spent grains. Other separation methods, for example, centrifuging, or a combination of methods, such as lautering and centrifuging, may be used. The mash is preferably filtered without cooling, but, if desired, may be cooled before filtration. The filtered digest is then sparged and the wort brought up to the desired volume.

(D) This procedure is a modification of any one of the foregoing procedures A to C in which the discrete amyloglucosidase enzyme is omitted from the mashing process, but incorporated into the wort, for instance, after the wort has been boiled but prior to the fermentation. In obtaining the wort itself, the process steps outlined for each of procedures A to C can be followed save for the omission of the amyloglucosidase enzyme.

Each of the foregoing procedures A to D is preferably modified by the introduction of a cereal adjunct into the main mass at a convenient stage. The use of a cereal adjunct permits substantial cost savings and, at the same time, is considered to give a paler coloured beer with a better shelf life.

The cereal adjunct may be derived from raw or unprepared starch-bearing cereal grain or prepared, i.e. pregelatinised, starch-bearing cereal grains. The cereal grains should be used in an amount of between about 10 and about 60%, preferably between about 42% and about 55%, by weight relative to the weight of cereal substrate, for example, barley, in the initial step, so that the cereal substrate:adjunct ratio in the final mash bill is between 90:10 and 63:37. More commonly, in practising this invention, the cereal substrate:adjunct ratio is between about 65:35 and 70:30. The relatively high adjunct contents which can be accommodated by this process normally give worts with satisfactory nitrogen contents.

The prepared cereal grains may be introduced directly into the main mass, preferably in the initial formation of the aqueous slurry. The raw, unprepared cereal grains, on the other hand, are desirably liquefied prior to the introduction, in order to gelatinise the starch thereby making it available for subsequent liquefaction and, when combined with the main mass, saccharification. This may be accomplished by pre-cooking the cereals in a separate vessel, commonly termed the cereal cooker.

The pre-cooking operation may be performed by mixing the raw cereal grains, for instance, corn grits, with water and either finely ground barley malt or a suitable discrete α-amylase enzyme. The mixture is heated at about 70° to about 80° C. for about 10 to 30 minutes to gelatinise the starch and liquefy it by the action of α-amylases derived from the malt or the discrete enzyme, and then boiled. When barley malt is employed in the precooking operation, it is normally added in an amount of between 10% and 25% of the raw cereal grains. Preferably, however, a discrete α-amylase enzyme is employed in the cooker operation. Conveniently, the same α-amylase source as used in the treatment of the cereal substrate, is utilised as the source of α-amylase in this cooker operation. I have found that for satisfactory liquefaction in pre-cooking, it is adequate if the enzyme or enzyme mixture is used at a level of at least 10 amylase units/gm. of raw cereal grains, for example, between 14 and 16 amylase units/gm. of raw cereal grains.

When following procedures A and B, the liquefied cereal adjunct is conveniently incorporated after the initial proteolytic reaction period; with procedure C, it is conveniently incorporated after the high temperature liquefaction.

When barley is used as the cereal substrate in the foregoing procedures, a properly balanced, light-coloured wort with satisfactory starch and protein breakdown may be obtained following the sequence of steps outlined in the several flow sheets. Moreover, such a wort normally has higher fermentable sugar and nitrogen contents, as indicated by apparent attenuations of around 75% or more, total nitrogen levels of around 750 to 950 mg./litre or more and formol nitrogen levels of around 200 to 250 mg./litre, compared with the worts that can be consistently obtained following the teachings of the aforementioned prior art specification.

The wort so obtained may be used directly in making beer by the conventional process steps, so serving as a full replacement for a conventionally produced wort which simplifies the plant required and results in other economies. Alternatively, the wort may be evaporated to a syrup using, for example, a vacuum evaporator. This syrup may then be stored until required, say, to increase the throughput of a conventional process at peak times. In this event, the syrup, before use, is diluted with water. Advantageously, the syrup contains between about 70 and about 85% by weight total solids, preferably about 75 to 80%. Alternatively, the wort may be dried into a powder using, for example, a spray drier, which is then dissolved in water to give a wort as and when required. When concentrating or drying, careful temperature control is needed to avoid discolouring or otherwise damaging the wort properties. Bittering substances like hops may be added before concentrating or drying the wort.

In converting the wort into beer, the conventional procedures are employed. For instance, the wort is admixed with bittering adjuncts like hops and boiled. The heat completely inactivates the enzymes and sterilizes the wort, while the extraction of the hops provides flavour and preservative constituents. The wort is thereafter cooled and fermented by the addition of an appropriate brewers' yeast, such as a "bottom yeast" commonly employed in the manufacture of the type of alcoholic beverage generally known as lager, or a "top yeast" commonly employed in the manufacture of the type of alcoholic beverage generally known as ale. The yeast utilises the normally fermentable sugars which are present in the wort. The primary fermentation of the wort (bottom yeast) typically takes place at about 7° to 14° C., and usually takes from 3 to 10 days. This is followed by the secondary "lager" fermentation usually at 0° to 5° C. for about two to eight weeks or longer. Thereafter, the beer is clarified or filtered, carbonated and packaged.

EXAMPLES OF PREFERRED EMBODIMENTS

The following examples, some of which are comparative in nature, are provided to facilitate a more comprehensive understanding of the present invention. It will be understood that the examples are given by way of illustration only and should not be construed as limiting the scope of the invention.

EXAMPLE 1

This example illustrates the preparation of a brewers' wort and beer according to this invention under actual brewery conditions.

Part A—Brewers' wort (i) Barley: Conquest barley was used. This barley was cleaned and then hulled giving around 10% w./w. hulls, and the hulls separated by aspiration. The barley kernels were then ground in a Hobart Model 2020 Grinder adjusted to No. 1 setting, and ground grains mixed with the hulls. The mixture had the following spectrum determined by screen analysis (U.S.A. Standard Sieve Size).

| Mesh No.: | Percent w./w., retained on screen |
|---|---|
| 10 | 2 |
| 14 | 24 |
| 18 | 45 |
| 30 | 17 |
| 60 | 8 |
| 100 | 2 |
| Pan | 2 |

(ii) Water: Standard brewing water was used with a total hardness of around 30 p.p.m. and a pH of between 5.3 and 5.6.

(iii) Salt addition: 6 gms. gypsum and 9.5 g. calcium chloride per 12½ Imperial Gallons were added to the water used for slurrying the barley.

(iv) Enzymes.—(a) and (b) protease and α-amylase: In this example, a discrete enzyme mixture was used as the source both of protease and α-amylase. This enzyme mixture was derived from a *Bacillus subtilis* strain (ATCC 21556) and prepared following essentially the same procedures as set forth in Example 2 in commonly assigned co-pending application No. 52,999, filed on July 7, 1970. In this instance, the filtrate obtained assayed as follows:

Amylase activity: 1600 modified Stein-Fisher units/ml.
Protease activity: 10.0 modified Kunitz units/ml.
Neutral protease: 6.2 modified Kunitz units/ml.
Alkaline protease: 3.8 modified Kunitz units/ml.

The broth was stabilised by the addition of propylene glycol (5.0% w./v.) and potassium sorbate (1% w./v.).

(c) β-Amylase: Ground barley malt was used as the β-amylase source with a diastatic activity of 137° Lintner. The grist spectrum as determined by screen analysis (U.S.A. Standard Sieve Sizes) was as follows:

| Mesh No.: | Percent w./w., retained on screen |
|---|---|
| 10 | 10 |
| 14 | 16 |
| 18 | 26 |
| 30 | 28 |
| 60 | 12 |
| 100 | 4 |
| Pan | 4 |

(d) Amyloglucosidase: The amyloglucosidase enzyme used was that commercially available from Miles Laboratories, Inc., Ind., U.S.A., under the name Diazyme. The particular material used was Diazyme in powder form standardized at 160 A.G. per gm. This enzyme has a pH optimum between 3.5 and 5.0. However, it exhibits good activity up to pH 7. The temperature optimum is 50° C., though Diazyme has reasonable activity up to 60° C.; it is substantially deactivated at temperatures above 80° C. Diazyme also contains small quantities of cellulase, alpha-amylase and protease. The enzyme is stable when kept in sealed containers, under dry, cool conditions.

(v) Corn grits: Raw corn grits with a moisture content of 11.5% w./w. were used as a cereal adjunct. The spectrum as determined by screen analysis (U.S.A. Standard Sieve Sizes) was as follows:

| Mesh No.: | Percent w./w., retained on screen |
|---|---|
| 30 | 15.5 |
| 60 | 80 |
| 100 | 2.5 |
| Pan | 2 |

(VI) MASH BILL

| Constituent | Total weight, kg. | Ratio | Extractable weight, kg. |
|---|---|---|---|
| Barley | 6.205 | 64 | 3.850 |
| Raw corn grits | 3.468 | 36 | 2.850 |
| Malt (β-amylase source) | 0.610 | | 0.427 |

Part B—Mash cycle

Figure 4:
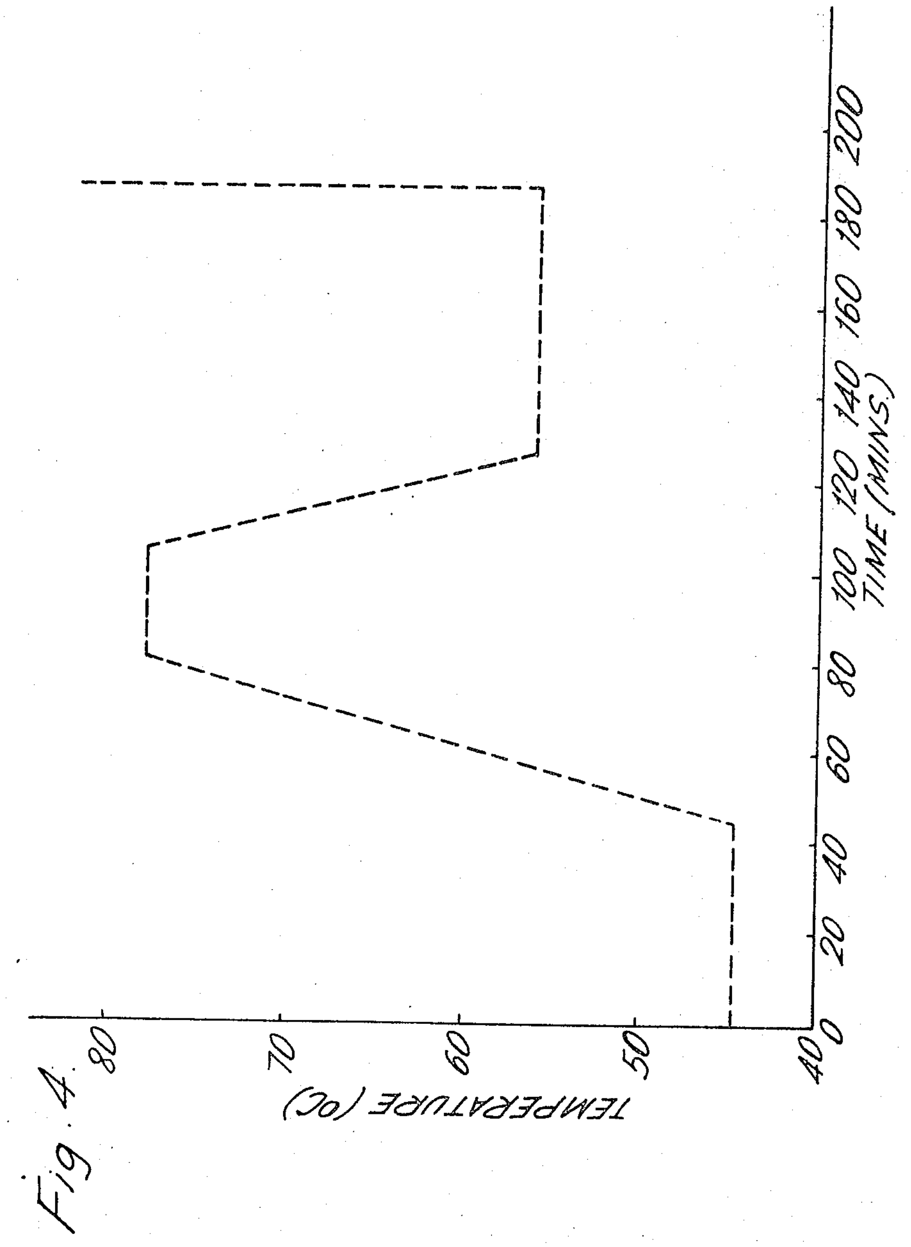
FIGS. 4 to 6 are graphs showing the temperature and time ranges delineating satisfactory mash cycles in the preferred embodiments of this invention.

The mash cycle followed is indicated in the graph reproduced as FIG. 4 of the accompanying drawings.

Step (a): 24 litres of water were added to a stirred tank reactor, and the salt stabilized enzyme-containing broth slowly stirred in at an enzyme level of 115 α-amylase units and 0.7 protease units per gm. of barley subsequently to be incorporated. Thereafter, 6.205 kg. ground barley were added. The slurry so-obtained was vigorously stirred.

Step (b): The temperature of the aqueous slurry was raised to 44.5° C. by steam heating through the vessel jacket. This temperature was held for 45 minutes, during which time the slurry was continuously stirred.

Step (c): Simultaneously the raw corn grits were liquefied. 12 litres of water were added to the corn cooker, and the salt stabilized enzyme-containing broth slowly stirred in at an enzymic level of 14 α-amylase units per gm. of raw corn grits subsequently to be incorporated. 3.458 kg. raw corn grits were then added, and the slurry vigorously stirred. The slurry was first heated to 71° C., and this temperature held for 16 minutes. Thereafter, the corn mash was brought to the boil (come-up time≡2 minutes), and held at boiling point for 2 minutes. The liquefied mash was then dropped into the barley mash in the stirred tank reactor at the end of the 45 minutes proteolytic reaction time. The combined mass was vigorously stirred to disperse the liquefied corn mash.

Step (d): The temperature of the combined mass was then gradually raised to 78° C. (come-up time≡15 minutes), again by steam heating through the vessel jacket. This temperature was maintained for 25 minutes during which period the α-amylase enzyme liquefied (solubilized) the barley grains with the production of oligosaccharides and branched limit dextrins. Throughout this entire step, the mass was vigorously stirred.

Step (e): The liquefied mass was then transferred by means of a reciprocating, diaphragm-type pump from the reactor, through a heat exchanger in which it was cooled to a second stirred tank reactor. The residence time in the heat exchanger was around 2 minutes at the end of which period the temperature of the medium had fallen to about 56° C.

Step (f): 0.610 kg. ground barley malt and the Diazyme at an active level of $6.4\times10^{-1}$ amyloglucosidase units per gm. barley grain substrate were added rapidly and without interruption to this second reactor, and dispersed by stirring. The residence time in this reactor was 1 hour and during this period the temperature was maintained, by steam heating through the vessel jacket, at around 56° C. and the medium was continuously stirred.

Step (g): At the end of this period the saccharified mash was pumped to a conventional lauter tun in which the mash was allowed to settle for about 10 minutes. It was noted that the clarity of the filtrate (wort) collected was good. The run-off time was about 30 minutes.

The wort was light-coloured, and had a properly balanced amino acid and carbohydrate spectrum. This wort was then boiled in the kettle. Before the boil was started, 42.8 g. of hops were added to the wort in the kettle. The wort was boiled for 90 minutes. 30 minutes before the end of the boil, an additional 28.8 g. of hops and 2.9 g. Irish moss were added followed, 5 minutes before the end of the boil, with a further 14.4 g. of hops. During the open boil the volume fell by evaporation from 61 litres to about 56–59 litres. At the conclusion of the boil the wort was placed in the hop jack where it remained for 10 minutes. The wort was then slowly run into the pan where it was allowed to settle for 30 minutes. An analysis showing representative wort properties (after this boil) is given in Table 1 hereunder, which also includes, for comparative purposes, an analysis of a typical conventional wort suitable for the commercial manufacture of beer.

TABLE I

| Property | Barley/ enzyme wort | Conventional wort |
|---|---|---|
| Extract (° P.) | 11.2 | 11.9 |
| Total nitrogen (mg./litre) | 962 | 875 |
| Formol nitrogen | 240 | 243 |
| pH | 5.2 | 5.1 |
| Apparent attenuation, percent | 78 | 79 |

The amino acid spectrum of the wort was then compared with the amino acid spectrum of a conventional malt wort and showed no essential difference.

Characteristic features of this, and other worts obtained following the process of this invention, are the increased attenuation and low carbohydrate content, compared with worts derived from an enzymatic process in which the amyloglucosidase is omitted.

Part C—Beer

This wort cooled to 14.4° C. in a plate cooler was run-off into the fermenter and converted directly into beer by the following procedure.

(i) Fermentation: A lager yeast (*Saccharomyces Carlsbergensis*) was added to the wort at a rate of 100 g. pressed yeast per 40 litres wort. Wort was placed in a glass carboy and oxygen bubbled through to give dissolved oxygen level of 20 p.p.m. The yeast was then pitched and well mixed with the wort. Fermentation was continued for 7 days at 14.4° C. At the end of the fermentation, the natural sulphur dioxide content of the primary storage beer was adjusted to 15 p.p.m. by the addition of sodium metabisulphite.

(ii) Aging: A stainless steel keg was used for aging. The beer was dropped into the keg and 0.068 ml. Protesal (a chill-proofing enzyme) added and the keg put under 20 p.s.i.g. carbon dioxide pressure. Primary aging was effected at 1° C. (33° F.) for 14 days, after which the beer was passed to filtration.

(iii) Filtration: The primary filtration was made through a sparkler filter. The beer was filtered into another keg to which was added Clearfil filter aid (7.0 g.). The beer was then filtered again through a sparkler filter with a coating of 4C filter aid (23 g.) into another keg. Following secondary filtration the beer was carbonated to 2.8–3.0 volumes.

(iv) Bottling: The beer was bottled with the keg under 15 p.s.i.g. $CO_2$; before capping the bottles were tapped to release dissolved oxygen.

(v) Pasteurization: The beer was pasteurized at 60° C. for about 2 minutes. The total time in the pasteurizing tunnel was 26.6 minutes, with an exit temperature of about 27° C. (80° F.).

(vi) Storage: The bottled beer was stored at room temperature or in a refrigerator at +4° C. (39° F.). Tasting was made immediately after bottling and during storage. The matured beer was judged by means of standard physico-chemical analysis and organoleptic tests. Pertinent results, as well as the analysis of a commercal control beer derived from a conventional malt wort, included for comparative purposes, are shown in Table II following.

TABLE II

| Property | Barley/ enzyme beer | Conventional beer |
|---|---|---|
| Apparent extract, percent | 2.4 | 2.4 |
| Real extract, percent | 3.7 | 4.16 |
| Alcohol, percent | 4.2 | 3.8 |
| Original extract, percent | 12.0 | 11.9 |
| Apparent attenuation, percent | 80.0 | 79.5 |
| Colour (SRM) | 3.0 | 3.1 |
| pH | 4.7 | 4.0 |
| Isohumolone (IBU) | 18 | 17 |
| Foam (SIG) | 136 | 134 |
| Diacetyl p.p.m | 0.04 | 0.08 |
| Protein, percent | 0.32 | 0.32 |
| $SO_2$, p.p.m | 3.9 | 4.0 |
| Iron, p.p.m | 0.11 | 0.12 |
| Force haze test (1 week) | 120 | 200 |
| Dimethyl sulphide, p.p.b | 97 | 108 |
| Acetaldehyde, p.p.m | 4.4 | 4.1 |
| Ethyl acetate, p.p.m | 30 | 34.3 |
| n-Propanol, p.p.m | 5.4 | 6.7 |
| iso-Butanol, p.p.m | 16.0 | 20.7 |
| Amyl alcohol, p.p.m | 63.2 | 68.2 |

Referring to this table, it will be seen that the enzymatic beer is similar in most respects to the control beer, save that it has a higher alcohol content and a markedly superior haze stability. With regard to organoleptic properties, the barley/enzyme beer had a crisp, beer palate. Statistical analysis of the results obtained from experienced brewery taste panels, showed that there was no clear preference for either, so that the enzymatic beer was just as acceptable as the commercial control beer.

In comparison with the beer derived from the process of the aforementioned prior art specification (in this case following the teaching of the Example 1 therein), the instant beer had a superior flavour (more body) and a better stability, which is to be expected as the wort from which it was made had a higher attenuation and formol nitrogen content.

EXAMPLE 2

The raw materials used in this example were identical to those of the foregoing example except for the following differences:

(i) The enzyme complex used assayed at 6370 modified Stein-Fischer α-amylase units per ml. and 44.3 modified Kunitz protease units per ml. and was obtained from *Bacillus subtilis* ATCC 21556 by a similar procedure to that described in Example 1 of the aforementioned copending application.

(ii) A liquid Diazyme preparation (LD 30—also commercially available from Miles Laboratories) with an activity of 30 A.G. units per ml. was used.

(iii) A coarser grind corn with the following sieve analysis was used:

| Mesh No.: | Percent w./w. retained on screen |
|---|---|
| 10 | |
| 14 | 0.75 |
| 18 | 10.3 |
| 30 | 37.25 |
| 60 | 44.75 |
| 100 | 4.6 |
| Pan | 2.4 |

The procedure followed in this example was the same as that in the foregoing example except that the enzymes were used at levels of 100 α-amylase units, 0.7 protease units and 0.47 A.G. units per gm. of barley and the temperature during and duration of the solubilization (step d) and saccharification (step f) steps were varied as shown in the table below. The worts so-obtained were analyzed before boiling for different properties and the results obtained for each run (conducted in duplicate) are summarized in Table III below:

TABLE III

| | | | | | | | | | | | | |
|---|---|---|---|---|---|---|---|---|---|---|---|---|
| Step: | | | | | | | | | | | | |
| Solubilization (Step d): | | | | | | | | | | | | |
| Temp. (° C.) | 65 | | 70 | | 75 | | 80 | | 85 | | 90 | |
| Time (mins.) | 40 | | 30 | | 30 | | 20 | | 20 | | 10 | |
| Saccharification (Step f): | | | | | | | | | | | | |
| Temp. (° C.) | 60 | | 60 | | 55 | | 50 | | 45 | | 40 | |
| Time (mins.) | 30 | | 60 | | 60 | | 60 | | 90 | | 90 | |
| Wort properties: | | | | | | | | | | | | |
| Extract (° P.) | 10.0 | 10.05 | 10.15 | 10.2 | 10.4 | 10.2 | 10.2 | 10.15 | 10.1 | 10.2 | 10.35 | 10.45 |
| Total nitrogen (mg./litre) | 758 | 757 | 782 | 785 | 770 | 745 | 751 | 756 | 722 | 710 | 702 | 710 |
| Formol nitrogen (mg./litre) | 204 | 201 | 210 | 195 | 190 | 192 | 185 | 190 | 182 | 187 | 185 | 184 |
| Q.F. (° P.) | 2.0 | 2.0 | 2.05 | 2.05 | 2.2 | 2.1 | 2.2 | 2.2 | 2.4 | 2.3 | 2.3 | 2.25 |
| Attenuation, percent | 80.0 | 79.69 | 79.8 | 79.9 | 78.8 | 79.1 | 80.0 | 78.3 | 76.2 | 78.5 | 79.3 | 78.5 |

All the worts gave acceptable beers on fermentation by the procedure of Example 1.

EXAMPLE 3

Part A—Raw materials

In this example, the raw materials used were the same as in Example 1, except for the following differences:

(i) A commercial bromelain (derived from pineapple juice) obtained from Mann Research Laboratories, New York, U.S.A. (Catalogue No. 05300–293) was used as a source of protease enzyme.
(ii) The α-amylase source was the discrete enzyme complex used in the preceding example.
(iii) The amyloglycosidase source was liquid Diazyme LD–30 assaying at 30 A.G. units per ml.

Part B—Mash cycle

Figure 5:
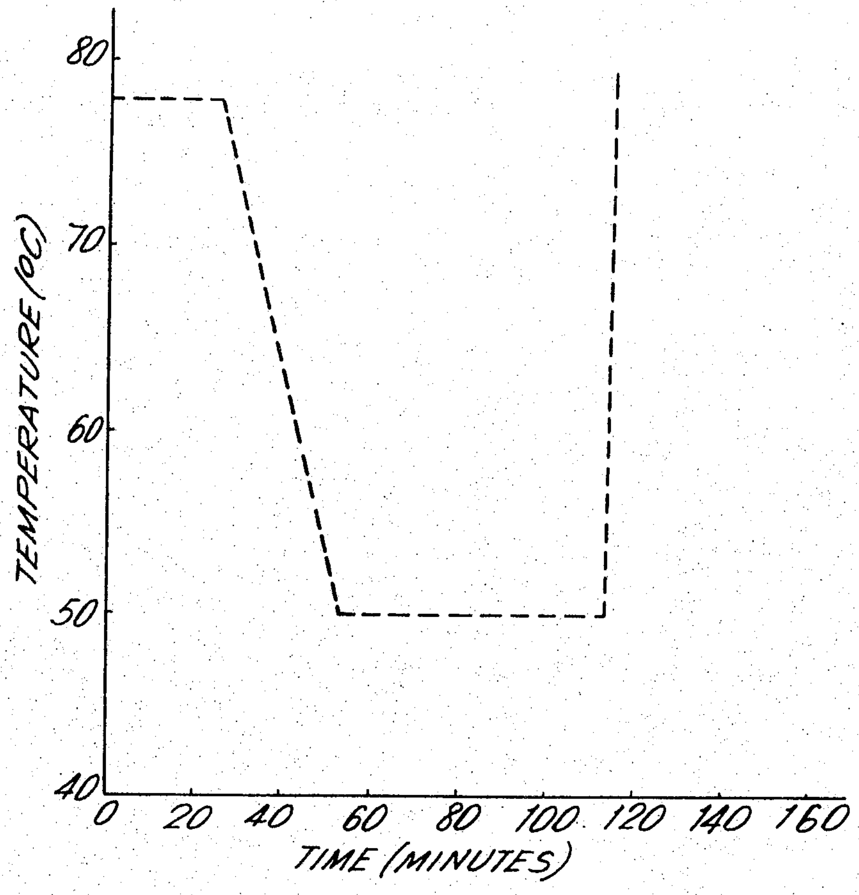

The temperature/time relationships in the mash cycle followed is indicated in the graph reproduced as FIG. 5 of the accompany drawings.

Step (a): 24 litres of water were added to a stirred tank reactor and the salt-stabilized enzyme-containing broth slowly stirred in at an enzymic level of 100 α-amylase units and 0.7 protease units per gm. of barley subsequently to be incorporated. Thereafter, 6.205 kg. ground barley were added. The slurry so-obtained was vigorously stirred.

Step (b): The temperature of the aqueous slurry was raised to 78° C. (come-up time≡15 minutes) by direct steam injection. This temperature was held for 25 minutes, during which time the slurry was continuously stirred, and the α-amylase enzyme liquefied (solubilized) the barley grains with the production of oligosaccharides and branched limit dextrins.

Step (c): The liquefied mass was then conveyed via a reciprocating diaphragm-type pump from the reactor through a heat exchanger in which it was cooled. The residence time in the heat exchanger was around 20 minutes, at the end of which period the temperature of the mass had fallen to about 56° to 60° C.

Step (d): Simultaneously with the liquefaction of the barley grain substrate, the cereal adjunct derived from the raw corn grits, was prepared. 12 litres of water were added to the corn cooker 12, and the salt-stabilized enzyme-containing broth (as used in step (a)) slowly stirred in at an enzymic level of 14 α-amylase units per gm. of raw corn grits subsequently to be incorporated. 3.458 kg. raw corn grits were then added, and the slurry vigorously sitrred. The slurry was first heated to 71° C., and this temperature held for 16 minutes. Thereafter the corn mash was brought to the boil (come-up time≡2 minutes), and held at boiling point for 2 minutes.

Step (e): From the heat exchanger, the medium from step (c) was passed to a second stirred tank reactor. The liquefied mash from the corn cooker in step (d) was then dropped into the liquefied mass in the stirred tank reactor. The combined mass was vigorously stirred to disperse the liquefied corn mash. Thereafter, the bromelain protease enzyme and the ground barley malt were added simultaneously and without interruption, and uniformly dispersed by stirring. The residence time in this reactor was 1 hour, and during this period the temperature was maintained at about 56° C. and the mass was continuously stirred.

Step (f): At the end of this period, the proteolysed and saccharified mash was pumped to a conventional filter press in which the mash was allowed to settle for about 10 minutes. It was noted that the clarity of the filtrate collected was good. The run-off time was about 25 minutes.

The wort so-obtained was boiled in the kettle by the same procedure as in Example 1. The boiled wort was then analyzed, and the results are summarized in Table IV below:

TABLE IV

| Wort property: | Result |
|---|---|
| Wort extract (° P.) | 11.9 |
| Total nitrogen (mg./litre) | 757 |
| Formol nitrogen (mg./litre) | 214 |
| pH | 5.2 |
| Attenuation (percent) | 79 |

The wort was light-coloured and had amino acid and carbohydrate spectra similar to a conventional malt wort.

Part C—Beer

This wort was converted directly into good quality beer following the procedure of Part C of Example 1.

EXAMPLE 4

Using the same raw materials and following the same procedure as in the foregoing example, except that the temperature during, and the duration of, the solubilization (step b) and proteolysis/saccharification (step e) steps were varied as shown in Table V which also summarizes relevant properties of the worts (before boiling) so-obtained in each run (conducted in duplicate).

TABLE V

| | Results | | | | | | | |
|---|---|---|---|---|---|---|---|---|
| Step: | | | | | | | | |
| Solubilization: | | | | | | | | |
| Temp. (° C.) | 70 | | 75 | | 80 | | 85 | |
| Time (mins.) | 30 | | 30 | | 30 | | 30 | |
| Proteolysis/saccharification: | | | | | | | | |
| Temp. (° C.) | 60 | | 55 | | 50 | | 45 | |
| Time (mins.) | 60 | | 60 | | 60 | | 60 | |
| Wort property: | | | | | | | | |
| Wort extract (° P.) | 10.1 | 10.0 | 10.3 | 10.3 | 10.55 | 10.55 | 10.25 | 10.3 |
| Formol nitrogen (mg./litre) | 192 | 190 | 205 | 201 | 208 | 195 | 191 | 197 |
| Q.F | 2.2 | 2.2 | 2.25 | 2.3 | 2.2 | 2.2 | 2.25 | 2.3 |
| Attenuation, percent | 78.2 | 78.0 | 78.1 | 77.7 | 79.1 | 79.1 | 78.0 | 77.7 |

Each of the worts was fermented into good quality beer by the procedure of Example 1.

EXAMPLE 5

Part A—Raw materials

The raw materials used in this example were similar to those used in Example 1 except that the following protease and amylase enzymes were used in some instances as indicated below.

PROTEASE

The protease enzyme used was a commercial bromelain, in solid form, obtained from Mann Research Laboratories.

(a) α-Amylase: HT–1000, commercially available from Miles Laboratories, Inc., Ind., U.S.A. This is a heat stable, liquefying enzyme derived from a *Bacillus subtilis* strain high in α-amylase activity. This enzyme also exhibits significant protease activity.

(b) Dextrinase A: Dextrinase A, commercially available from Miles Laboratories, Inc., Ind., U.S.A. This is a fungal amylase high in saccharogenic activity for conversion of detrins to maltose and dextrose. This enzyme also exhibits significant protease activity.

TABLE VI

[The enzymes were used in the following combinations, with ground barley malt (10.1% by weight) of 137° Lintner present in each instance]

| | Activity units/gm. of barley substrate | | |
|---|---|---|---|
| Enzyme | Blend A | Blend B | Blend C |
| Bromelain | 0.8 | (*) | 1.2 |
| HT–1000 | 68 | 105 | 120 |
| Dextrinase A | 125 | 140 | 100 |
| Diazyme | $6.4\times10^{-1}$ | $3.3\times10^{-1}$ | $8.5\times10^{-1}$ |

*In this instance, the HT–1000 and the Dextrinase A contributed the required protease activity (about 0.5 protease units/gm.), and no separate protease enzyme was added.

Part B—Mash cycle

In each instance, the enzyme blend was employed to convert the barley grains following the mash cycle shown in the graph given as FIG. 6.

Step (a): 24 litres of water were added to the mash tun, and the appropriate blend slowly stirred in at the designated enzymatic levels. Thereafter, 6.205 kg. ground barley and 0.610 kg. ground barley malt were added. The slurry so-obtained was vigorously stirred.

Step (b): Steam was admitted to the jacket of the mash tun, and the temperature of the aqueous slurry raised to 46° C. This temperature was held for 45 minutes, during which time the slurry was continuously stirred.

Step (c): Simultaneously, the raw corn grits were liquefied. 12 litres of water were added to the corn cooker, and the salt-stabilized α-amylase enzyme-containing broth used in the foregoing example slowly stirred in at an enzymic level of 14 α-amylase units per gm. of raw corn grits subsequently to be incorporated. 3.458 kg. raw corn grits were then added and the slurry vigorously stirred. The slurry was first heated to 71° C., and this temperature was heled for 16 minutes. Thereafter, the corn mash was brought to the boil (come-up time≡8 minutes), and held at boiling point for 2 minutes. The liquefied mash was then dropped into the barley mash in the mash tun at the end of the 45 minute proteolytic reaction time.

Step (d): The temperature of the combined mash was raised to 65.5° C. (come-up time≡12 minutes) and this temperature was maintained for 45 minutes as a first saccharification step. Thereafter, the temperature was raised to 74° C. with a come-up time of 10 minutes. This temperature, when attained, was held for 15 minutes as a second saccharification step. At the end of the 15 minutes, the digested mash was raised to 80° C., and held at this temperature for 1 minute.

Step (e): The mash at 80° C. was dropped directly into the lauter tun. The bottom of the lauter tun was covered with water to prevent the mash particles from clogging the slits in the plates. The mash was allowed to settle for 10 minutes, after which the wort was recycled for 5 minutes.

The wort was then run off. It was noted that the clarity was good. Once the wort was run down to bed level sparging was commenced with water at 77° C. Lautering was continued until a total of 61.3 litres wort were collected. The run-off time was 45 minutes.

The wort so-obtained from each of the blends was light-coloured and had a properly balanced amino acid and carbohydrate spectrum. Pertinent analytical data pertaining to this wort is shown in Table VII below.

TABLE VII

| Property | Blend A | Blend B | Blend C |
|---|---|---|---|
| Extract (° P.) | 10.7 | 10.6 | 10.6 |
| Total nitrogen (mg./litre) | 820 | 818 | 842 |
| Formol nitrogen (mg./litre) | 221 | 208 | 230 |
| pH | 5.2 | 5.2 | 5.2 |
| Apparent attenuation, percent | 79 | 81 | 82 |

The amino acid spectrum of the worts when compared with the amino acid spectrum of a conventional malt wort showed no essential difference.

Part C—Brewing

The worts were then converted into beer of good quality following the same procedure as in Example 1.

EXAMPLE 6

This example illustrates the effect upon wort properties of increasing the amyloglucosidase enzyme level used in the conversion of the barley.

The experiments were conducted on standard laboratory mash units fitted with cooker and mash cups. The following raw materials were used.

MASH BILL

[Two different mash bills in two parallel sets of experiments]

| | Part A | Part B |
|---|---|---|
| Corn cooker: | | |
| Corn | 28.3 g | 32.1. |
| Water | 125 mls | 140 mls. |
| α-Amyl | Enzyme complex used in Ex. 1 at 14 amylase units per gm. corn. | |
| Salts | 0.03 gms. gypsum. | |
| Mash mixer: | | |
| Barley | 65.5 g | 60.5 g. |
| Malt | 7.0 g | 7.0 g. |
| Water | 225 | 195. |
| Enzyme | As indicated below, 0.06 g. gypsum and 0.095 g. calcium chloride. | |
| Ratio (percent by weight): | | |
| Barley | 100 | 110. |
| Malt | 10.7 | 11.6. |
| Corn | 44.0 | 53.0. |

The barley was ground as in Example 1 and had a similar screen analysis; the corn was coarsely ground as in Example 2 and had a similar screen analysis.

ENZYMES (a) and (b)—Protease and α-Amylase

A discrete enzyme mixture derived by fermentation using *Bacillus subtilis* ATCC 21556 following a similar procedure to that set forth in Example 1 in the aforementioned copending application. This particular mixture assayed at 7670 α-amylase units per ml. and 70 protease units per ml. (A:P≡110:1) and in all experiments was used at a level of 114 α-amylase and 1.0 protease units per gm. barley.

(c) β-Amylase

The malt which was a ground barley malt of 130° Lintner.

(d) Amyloglucosidase

Diazyme in solid form assaying at 160 A.G. per gm. and used at levels varying from 0 to 350 A.G. units per gm. barley$\times 10^2$.

WATER

Ordinary brewery water at pH 5.4.

MASH CYCLE

The mash cycle shown in FIG. 6 was followed in all experiments using the following mashing procedure. The barley mash water was brought to a steady temperature of 45° C. in the mash cups; the salts, enzymes, barley and malt were added in that order, allowing about 30 seconds between each addition for thorough mixing. The slurry was vigorously agitated. The pH was noted. In the meantime, the corn was liquefied in the corn cooker by heating an aqueous slurry of the corn grits containing the α-amylase enzyme to around 70° C., holding at this temperature for 10 minutes then briefly boiling. The liquefied corn adjunct was mashed into the aqueous slurry of barley and enzymes in the mash cups and the mashing continued. At the end of the cycle, the temperature of the mash was raised to 80° C. and this temperature held for 2 minutes. The mash was then lautered and the lauter time recorded. The clarity of the run-off was estimated visually according to a graded scale from 1 to 5, 1 representing a murky and cloudy wort in contrast with 5 which represented a clear, bright (sparkling) wort. The starch conversion was also checked by the iodine color test. The lauter bed was sparged with water to a total volume of 610 mls. The made-up wort was then boiled for 1 minute, allowed to cool, then again made up to 610 mls. prior to analysis.

RESULTS

The results from the various experiments are summarised in Table VIII below, which also includes the results for a malt control experiment (68 gms. malt:26 gms. corn).

TABLE VIII

| Diazyme level. A.G./gm barley × 10² | Part A, wort properties: Extract (° P.) | Total nitrogen (mg./litre) | Formol nitrogen (mg./litre) | Q.F. (° P.) | Attenuation, percent | Part B, wort properties: Extract (° P.) | Total nitrogen (mg./litre) | Formol nitrogen (mg./litre) | Q.F. (° P.) | Attenuation, percent |
|---|---|---|---|---|---|---|---|---|---|---|
| 0 | 10.4 | 847 | 234 | 2.4 | 76.9 | 10.0 | 805 | 232 | 2.35 | 77.0 |
| 0.6 | 10.2 | 819 | 230 | 2.35 | 77.0 | 10.0 | 805 | 235 | 2.3 | 77.2 |
| 2.5 | 10.3 | 833 | 236 | 2.35 | 77.1 | 10.1 | 852 | 237 | 2.3 | 77.0 |
| 5.0 | 10.4 | 838 | 228 | 2.3 | 77.9 | 9.9 | 894 | 241 | 2.1 | 78.8 |
| 10 | 10.2 | 814 | 227 | 2.2 | 78.4 | 10.7 | 809 | 229 | 2.2 | 78.2 |
| 20 | 10.2 | 853 | 220 | 2.1 | 79.4 | 10.1 | 856 | 223 | 2.1 | 78.8 |
| 40 | 10.5 | 805 | 220 | 2.0 | 81.0 | 10.0 | 814 | 221 | 2.0 | 80.2 |
| 60 | 10.4 | 847 | 224 | 1.9 | 81.7 | 10.1 | 849 | 229 | 1.95 | 80.7 |
| 80 | 10.1 | 794 | 218 | 1.75 | 82.7 | 10.3 | 842 | 235 | 1.8 | 82.2 |
| 100 | 10.3 | 805 | 225 | 1.7 | 83.5 | 10.2 | 856 | 219 | 1.7 | 83.2 |
| 150 | 10.3 | 838 | 227 | 1.55 | 85.0 | 10.1 | 811 | 208 | 1.6 | 84.2 |
| 250 | 10.1 | 853 | 230 | 1.4 | 86.1 | 10.1 | 827 | 222 | 1.5 | 85.1 |
| 350 | 10.2 | 819 | 224 | 1.3 | 87.2 | 10.2 | 829 | 221 | 1.45 | 86.0 |
| Malt control | 10.3 | 845 | 212 | 2.25 | 78.2 | As for Part A | | | | |

CONCLUSIONS

Figure 7:
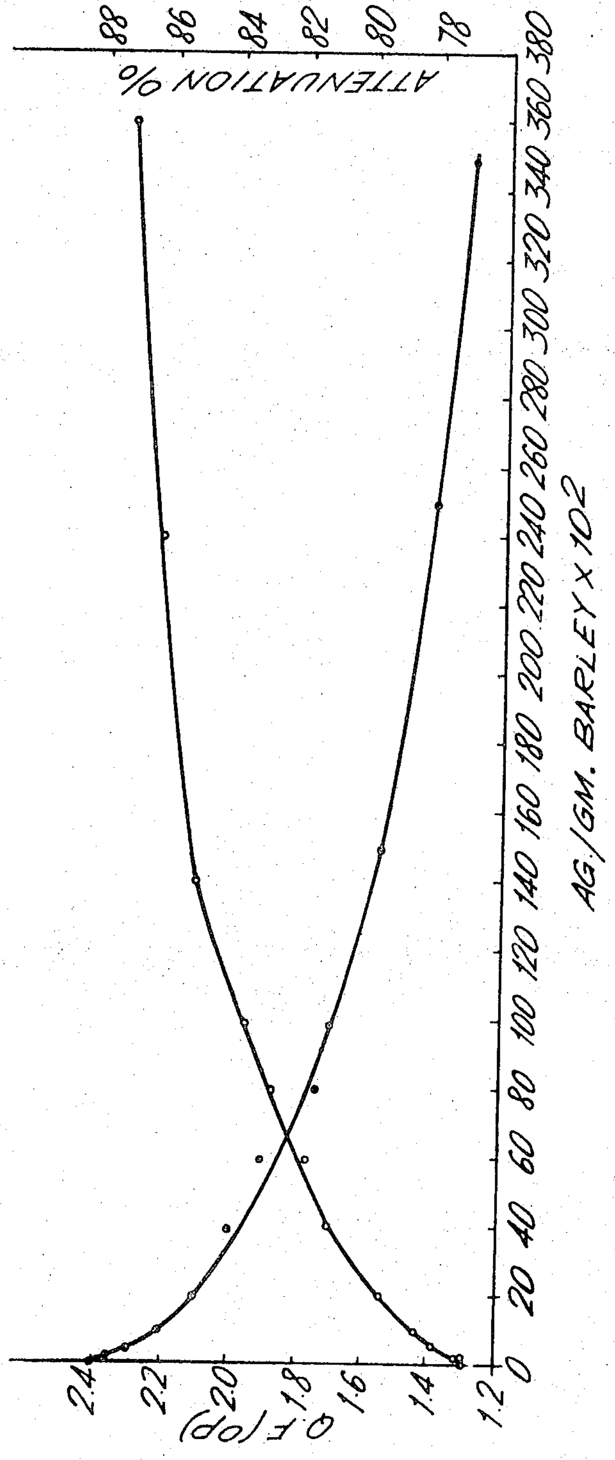
FIGS. 7 and 8 are graphs showing the effects of varying the level of the amyloglucosidase enzyme used in the mashing process on typical wort properties.
Figure 8:
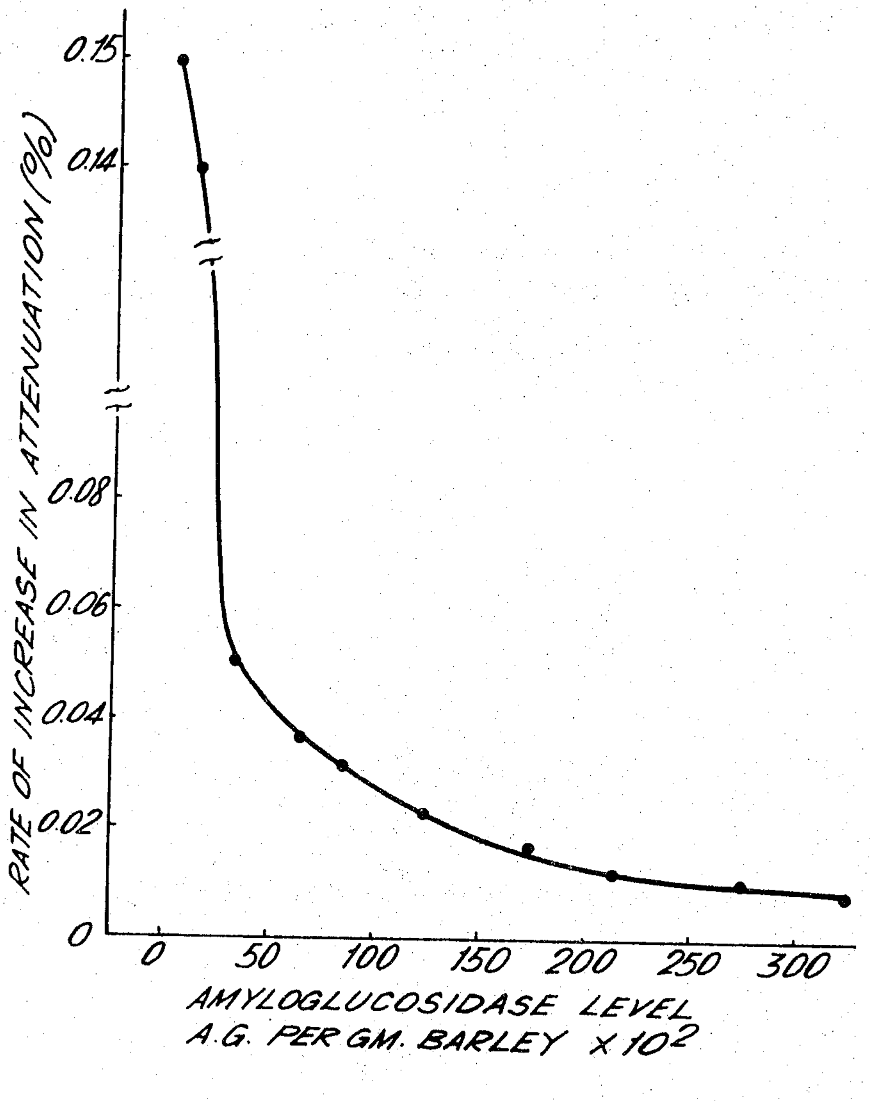

The improvement in wort fermentability resulting from the inclusion of the Diazyme is illustrated in the graph of FIG. 7 in which the fermentability (Q.F.) and attenuation values obtained in Part A are plotted against increasing Diazyme level. As shown, the Q.F. and attenuation improve with increasing Diazyme levels though as the Diazyme is increased beyond about $10\times10^{-1}$ A.G. units per gm. barley the rate of improvement is much less than at lower Diazyme levels. This is unexpected, and indicates that the optimum Diazyme level associated with maximum incremental benefit on wort properties is obtained at Diazyme levels lower than $10\times10^{-1}$ A.G. units per gm. The marked decrease in the rate of improvement in wort properties over about $10\times10^{-1}$ A.G. units per gm. is shown in the graph of FIG. 8 in which the incremental increase in attenuation is plotted against Diazyme level. From the graph, it can be seen that the most marked increase in attenuation is obtained between about $1\times10^{-1}$ and about $5\times10^{-1}$ A.G. units per gm.

Each of the worts was fermented into a beer by the procedure of Example 1. The beers made from worts in which less than $10\times10^{-1}$ A.G. units had been used were of good quality with a crisp, full-bodied flavor. The beers made from worts in which more than $10\times10^{-1}$ A.G. units had been used were not so acceptable having a noticeably "thin," apple-like flavor.

EXAMPLE 7

The procedure of the foregoing example was repeated exactly using the same raw materials except that a different mash bill and enzyme system were used as follows:

Mash bill

| | |
|---|---|
| Corn cooker: | |
| Corn | 27.3 gms. |
| Water | 90 mls. |
| Enzyme | Enzyme complex described below at 14 α-amylase units per gm. |
| Salts | 0.03 gm. gypsum. |
| Mash mixer: | |
| Barley | 62.0 gms. |
| Malt | 11.2 gms. |
| Water | 230 mls. |
| Enzymes | As described below. |
| Salts | 0.06 gm. gypsum, 0.095 gm. calcium chloride. |
| Ratio: | |
| Malt | 18%. |
| Barley | 100%. |
| Corn | 44%. |

The enzyme system comprised a discrete enzyme complex derived from *Bacillus subtilis* ATCC 21556 following a procedure similar to that set forth in Example 1 in the aforementioned copending application and assaying at 6370 α-amylase units per ml. and 53.4 protease units per ml. (Amylase:Protease≡119:1) and Diazyme in powder form assaying at 160 A.G. units per gm. The enzyme system was employed in the mash mixers at levels of 114 α-amylase units. 0.96 protease units and varying Diazyme (A.G.) levels as indicated in the following Table IX.

Results

The data obtained from analysis of each of the made-up worts is summarised in Table IX which also includes the corresponding data for a malt control wort (68 gms. malt: 26 gms. corn).

TABLE IX

| Diazyme level, A.G./gm. barley×10² | Wort properties: Extract (° P.) | Total nitrogen (mg./litre) | Formol nitrogen (mg./litre) | Q.F. (° P.) | Attenuation, percent |
|---|---|---|---|---|---|
| 0 | 10.15 | 810 | 213 | 2.4 | 76.4 |
| 0.6 | 10.2 | 812 | 209 | 2.35 | 77.0 |
| 2.5 | 10.2 | 790 | 217 | 2.35 | 76.9 |
| 10.0 | 10.1 | 797 | 213 | 2.25 | 77.7 |
| 20.0 | 10.15 | 805 | 211 | 2.10 | 79.3 |
| 40.0 | 10.25 | 802 | 211 | 2.0 | 80.5 |
| 80.0 | 10.1 | 810 | 209 | 1.75 | 82.7 |
| 100.0 | 10.3 | 812 | 210 | 1.7 | 83.5 |
| 150.0 | 10.25 | 800 | 209 | 1.55 | 84.9 |
| 250.0 | 10.2 | 801 | 217 | 1.4 | 86.3 |
| 350.0 | 10.1 | 804 | 213 | 1.3 | 87.1 |
| Malt control | 10.3 | 815 | 200 | 2.35 | 77.2 |

Conclusions

The foregoing results confirm the findings of Example 6, in particular that the most marked improvement in wort properties is obtained with Diazyme levels between about $2.5\times10^{-1}$ and about $10\times10^{-1}$ A.G. units per gm. barley.

Each of the worts was fermented into a beer by the procedure of Example 1. The beers made from worts in which less than $10\times10^{-1}$ A.G. units per gm. were of superior flavor (more full-bodied) than the beers made from worts in which more than $10\times10^{-1}$ A.G. units had been used.

EXAMPLE 8

This example illustrates the effect of varying the amylase, protease and amyloglucosidase on several pertinent wort properties.

The experiments were conducted on standard laboratory mash units fitted with cooker and mash mixer cups following the procedure of Example 6. The following raw materials were used:

Mash bill

| | |
|---|---|
| Corn cooker: | |
| Corn | 34.6 gms. |
| Water | 140 mls. |
| Enzyme | Enzyme complex of Ex. 1 at 14 amylase units/gm. corn. |
| Salts | 0.03 gm. gypsum. |
| Mash mixer: | |
| Barley | 62.0 gms. |
| Malt | 6.2 gms. |
| Water | 205 mls. |
| Enzyme | As indicated below. |
| Salts | 0.06 gm. gypsum, 0.095 gm. calcium chloride. |

The barley and the corn were ground on a laboratory scale grinder to an average particle size of around 1.41 mm.

Water

Ordinary brewery water at pH 5.2–5.6.

Enzyme

Four enzyme systems were selected to give a range of amylase and protease levels. These systems and the assays thereof are indicated below.

| Enzyme system | Code No. | Amylase units | Protease units | Amylase protease |
|---|---|---|---|---|
| Enzyme complex derived from *B. subtilis* ATCC 21556. | 1 | 5,450/ml | 6.2/ml | 879:1 |
| Do | 2 | 5,000/ml | 30/ml | 167:1 |
| Pacific protease A* | 3 | 7,250/gm | 157/gm | 46.2:1 |
| Pacific protease G* | | 10,200/gm | 490/gm | 20.8:1 |
| Pacific amylase 1* | | 105,000/gm | 340/gm | 308:1 |
| Blend (G plus 1) | 4 | 33,900/gm | 453/gm | 75:1 |

*Commercially available from Western Biochemical Corporation, California.

The Pacific protease G and Pacific Amylase 1 were blended in a ratio of 3:1 and designated Enzyme system #4. Each of the four enzyme systems was introduced into the barley mash at amylase levels of 45, 80, 100, 114 and 150 amylase units per gm. barley alone and along with Diazyme (in powder form assaying at 160 units/gm.) at levels varying from 10 to 350 A.G. units per 100 gms. barley giving different protease/amyloglucosidase combinations for the four basic enzyme systems as indicated in Table X below.

Results

The data obtained from each of the made-up worts is summarised in Table X which also includes the corresponding data for six malt control runs in which the mash bill used was as follows:

| | |
|---|---|
| Corn cooker: | |
| Corn | 24.9 gms. |
| Malt | 2.96 gms. |
| Water | 90 mls. |
| Mash mixer: | |
| Malt | 65 gms. |
| Water | 240 mls. |
| Salts | 0.06 gm. gypsum, 0.095 gm./calcium chloride. |

TABLE X

| Amylase (μ./gm. barley) | 45 | | | | | | | |
|---|---|---|---|---|---|---|---|---|
| Protease (μ./gm. barley) | 0.05 | | | | | | | |
| Diazyme A.G./100 gms. barley) | 0 | 10 | 20 | 40 | 80 | 150 | 250 | 350 |
| Wort properties: | | | | | | | | |
| Wort extract (° P.) | 9.8 | 9.8 | 9.9 | 10.0 | 9.8 | 9.7 | 10.0 | 9.9 |
| Total notrogen (mg./litre) | 440 | 430 | 455 | 440 | 450 | 450 | 455 | 440 |
| Formol nitrogen (mg./litre) | 128 | 126 | 120 | 133 | 130 | 135 | 130 | 128 |
| Q. F. (° P.) | 2.5 | 2.3 | 2.2 | 2.1 | 1.9 | 1.65 | 1.45 | 1.4 |
| Attenuation (percent) | 74.5 | 76.5 | 77.7 | 79.0 | 80.6 | 83.0 | 85.5 | 85.9 |
| pH | 5.5 | 5.5 | 5.6 | 5.5 | 5.5 | 5.5 | 5.6 | 5.5 |
| Conversion [a] | 5 | 5 | 4 | 5 | 5 | 5 | 4 | 4 |
| Run-off clarity [b] | 2 | 2 | 2 | 3 | 2 | 2 | 3 | 2 |
| Run-off time (mins.) | 35 | 35 | 35 | 35 | 40 | 40 | 35 | 40 |

| Amylase (μ./gm. barley) | 45 | | | | | | | |
|---|---|---|---|---|---|---|---|---|
| Protease (μ./gm. barley) | 0.27 | | | | | | | |
| Diazyme A.G./100 gms. barley) | 0 | 10 | 20 | 40 | 80 | 150 | 250 | 350 |
| Wort properties: | | | | | | | | |
| Wort extract (° P.) | 10.0 | 10.1 | 10.0 | 10.1 | 10.0 | 9.9 | 10.15 | 10.1 |
| Total notrogen (mg./litre) | 640 | 630 | 655 | 640 | 650 | 645 | 670 | 650 |
| Formol nitrogen (mg./litre) | 142 | 140 | 149 | 136 | 140 | 146 | 153 | 136 |
| Q. F. (° P.) | 2.4 | 2.25 | 2.05 | 2.0 | 1.8 | 1.6 | 1.4 | 1.35 |
| Attenuation (percent) | 76.0 | 77.7 | 79.5 | 80.2 | 82.0 | 83.8 | 86.2 | 86.6 |
| pH | 5.5 | 5.5 | 5.6 | 5.5 | 5.5 | 5.5 | 5.5 | 5.5 |
| Conversion [a] | 5 | 5 | 5 | 4 | 5 | 4 | 5 | 5 |
| Run-off clarity [b] | 2 | 2 | 3 | 3 | 2 | 2 | 2 | 2 |
| Run-off time (mins.) | 35 | 35 | 35 | 30 | 35 | 30 | 30 | 35 |

| Amylase (μ./gm. barley) | 45 | | | | | | | |
|---|---|---|---|---|---|---|---|---|
| Protease (μ./gm. barley) | 0.6 | | | | | | | |
| Diazyme A.G./100 gms. barley) | 0 | 10 | 20 | 40 | 80 | 150 | 250 | 350 |
| Wort properties: | | | | | | | | |
| Wort extract (° P.) | 10.2 | 10.2 | 10.3 | 10.2 | 10.3 | 10.35 | 10.1 | 10.2 |
| Total notrogen (mg./litre) | 720 | 745 | 710 | 710 | 725 | 740 | 730 | 730 |
| Formol nitrogen (mg./litre) | 165 | 161 | 173 | 161 | 165 | 177 | 159 | 168 |
| Q. F. (° P.) | 2.3 | 2.15 | 2.1 | 1.95 | 1.7 | 1.45 | 1.35 | 1.30 |
| Attenuation (percent) | 77.4 | 78.9 | 79.6 | 81.4 | 83.5 | 85.9 | 86.6 | 87.2 |
| pH | 5.4 | 5.5 | 5.5 | 5.5 | 5.5 | 5.5 | 5.4 | 5.5 |
| Conversion [a] | 5 | 5 | 5 | 5 | 5 | 5 | 5 | 5 |
| Run-off clarity [b] | 3 | 3 | 3 | 3 | 2 | 2 | 2 | 2 |
| Run-off time (mins.) | 35 | 30 | 30 | 30 | 35 | 35 | 30 | 30 |

| Amylase (μ./gm. barley) | 45 | | | | | | | |
|---|---|---|---|---|---|---|---|---|
| Protease (μ./gm. barley) | 0.97 | | | | | | | |
| Diazyme A.G./100 gms. barley) | 0 | 10 | 20 | 40 | 80 | 150 | 250 | 350 |
| Wort properties: | | | | | | | | |
| Wort extract (° P.) | 10.2 | 10.4 | 10.3 | 10.2 | 10.25 | 10.3 | 10.2 | 10.1 |
| Total notrogen (mg./litre) | 970 | 960 | 960 | 975 | 965 | 945 | 970 | 960 |
| Formol nitrogen (mg./litre) | 175 | 183 | 175 | 171 | 178 | 167 | 169 | 178 |
| Q. F. (° P.) | 2.2 | 2.0 | 1.9 | 1.75 | 1.65 | 1.4 | 1.3 | 1.25 |
| Attenuation (percent) | 78.9 | 80.7 | 81.6 | 82.8 | 83.9 | 86.4 | 87.2 | 87.6 |
| pH | 5.5 | 5.5 | 5.4 | 5.4 | 5.4 | 5.4 | 5.4 | 5.5 |
| Conversion [a] | 5 | 5 | 5 | 5 | 5 | 5 | 5 | 5 |
| Run-off clarity [b] | 3 | 3 | 3 | 3 | 2 | 2 | 2 | 2 |
| Run-off time (mins.) | 30 | 30 | 30 | 30 | 30 | 30 | 35 | ...... |

| Am ylase (μ./gm. barley) | 80 | | | | | | | |
|---|---|---|---|---|---|---|---|---|
| Protease μ./gm. barley) | 0.09 | | | | | | | |
| Diazyme (A.G./100 gms. barley) | 0 | 10 | 20 | 40 | 80 | 150 | 250 | 350 |
| Wort properties | | | | | | | | |
| Wort extract (° P.) | 9.8 | 9.9 | 9.8 | 10.0 | 9.9 | 9.85 | 9.9 | 9.85 |
| Total nitrogen (mg./litre) | 500 | 485 | 490 | 505 | 490 | 470 | 515 | 505 |
| Formol nitrogen (mg./litre) | 166 | 158 | 158 | 173 | 169 | 164 | 166 | 166 |
| Q. F. (° P.) | 2.4 | 2.3 | 2.1 | 1.95 | 1.85 | 1.65 | 1.4 | 1.3 |
| Attenuation (percent) | 75.5 | 76.8 | 78.6 | 80.5 | 81.3 | 83.2 | 85.8 | 86.8 |
| pH | 5.6 | 5.55 | 5.6 | 5.55 | 5.55 | 5.55 | 5.6 | 5.6 |
| Conversion [a] | 3 | 3 | 3 | 4 | 3 | 3 | 3 | 3 |
| Run-off clarity [b] | 4 | 3 | 4 | 4 | 4 | 4 | 4 | 4 |
| Run-off rinse (mins.) | 35 | 35 | 35 | 35 | 35 | 35 | 35 | 35 |

| Am ylase (μ./gm. barley) | 80 | | | | | | | |
|---|---|---|---|---|---|---|---|---|
| Protease μ./gm. barley) | 0.48 | | | | | | | |
| Diazyme (A.G./100 gms. barley) | 0 | 10 | 20 | 40 | 80 | 150 | 250 | 350 |
| Wort properties | | | | | | | | |
| Wort extract (° P.) | 10.2 | 10.2 | 10.1 | 10.3 | 10.2 | 10.0 | 10.1 | 10.1 |
| Total nitrogen (mg./litre) | 680 | 700 | 685 | 675 | 690 | 655 | 660 | 680 |
| Formol nitrogen (mg./litre) | 200 | 207 | 196 | 207 | 200 | 193 | 211 | 203 |
| Q. F. (° P.) | 2.15 | 2.1 | 1.9 | 1.8 | 1.7 | 1.5 | 1.3 | 1.2 |
| Attenuation (percent) | 78.9 | 79.4 | 81.2 | 82.5 | 83.3 | 85.0 | 87.1 | 88.1 |
| pH | 5.5 | 5.6 | 5.6 | 5.6 | 5.6 | 5.55 | 5.6 | 5.6 |
| Conversion [a] | 2 | 2 | 2 | 2 | 3 | 2 | 2 | 2 |
| Run-off clarity [b] | 5 | 5 | 5 | 5 | 5 | 4 | 4 | 4 |
| Run-off rinse (mins.) | 35 | 30 | 35 | 30 | 30 | 30 | 35 | 35 |

| Am ylase (μ./gm. barley) | 80 | | | | | | | |
|---|---|---|---|---|---|---|---|---|
| Protease μ./gm. barley) | 1.05 | | | | | | | |
| Diazyme (A.G./100 gms. barley) | 0 | 10 | 20 | 40 | 80 | 150 | 250 | 350 |
| Wort properties | | | | | | | | |
| Wort extract (° P.) | 10.5 | 10.5 | 10.55 | 10.6 | 10.5 | 10.4 | 10.6 | 10.4 |
| Total nitrogen (mg./litre) | 840 | 845 | 860 | 830 | 830 | 820 | 825 | 850 |
| Formol nitrogen (mg./litre) | 230 | 233 | 237 | 227 | 233 | 223 | 241 | 230 |
| Q. F. (° P.) | 2.1 | 2.0 | 1.85 | 1.75 | 1.7 | 1.4 | 1.2 | 1.1 |
| Attenuation (percent) | 80.0 | 8.10 | 82.5 | 83.5 | 83.8 | 86.5 | 88.7 | 89.4 |
| pH | 5.6 | 5.5 | 5.5 | 5.5 | 5.5 | 5.5 | 5.5 | 5.5 |
| Conversion [a] | 1 | 1 | 1 | 1 | 1 | 1 | 1 | 1 |
| Run-off clarity [b] | 4 | 5 | 5 | 5 | 5 | 4 | 5 | 5 |
| Run-off rinse (mins.) | 30 | 30 | 30 | 35 | 30 | 30 | 35 | 35 |

| Am ylase (μ./gm. barley) | 80 | | | | | | | |
|---|---|---|---|---|---|---|---|---|
| Protease μ./gm. barley) | 1.73 | | | | | | | |
| Diazyme (A.G./100 gms. barley) | 0 | 10 | 20 | 40 | 80 | 150 | 250 | 350 |
| Wort properties | | | | | | | | |
| Wort extract (° P.) | 10.6 | 10.7 | 10.7 | 10.75 | 10.6 | 10.5 | 10.65 | 10.6 |
| Total nitrogen (mg./litre) | 1,080 | 1,080 | 1,070 | 1,075 | 1,085 | 1,060 | 1,055 | 1,090 |
| Formol nitrogen (mg./litre) | 265 | 265 | 268 | 274 | 271 | 263 | 274 | 269 |
| Q. F. (° P.) | 2.2 | 2.1 | 1.9 | 1.8 | 1.65 | 1.4 | 1.3 | 1.2 |
| Attenuation (percent) | 79.2 | 80.4 | 82.2 | 83.2 | 84.4 | 87.5 | 87.9 | 88.7 |
| pH | 5.55 | 5.5 | 5.5 | 5.5 | 5.5 | 5.5 | 5.5 | 5.5 |
| Conversion [a] | 1 | 1 | 1 | 1 | 1 | 1 | 1 | 1 |
| Run-off clarity [b] | 5 | 4 | 4 | 5 | 4 | 4 | 3 | 4 |
| Run-off rinse (mins.) | 35 | 30 | 30 | 30 | 30 | 35 | 35 | 35 |

| Amylase (μ./gm. barley) | 100 | | | | | | | |
|---|---|---|---|---|---|---|---|---|
| Protease μ./gm. barley | 0.112 | | | | | | | |
| Diazyme (A. G./100 gms. barley) | 0 | 10 | 20 | 40 | 80 | 150 | 250 | 350 |
| Wort properties: | | | | | | | | |
| Wort extract (° P) | 10.1 | 10.1 | 10.15 | 10.1 | 10.0 | 9.95 | 10.1 | 10.0 |
| Total nitrogen (mls./litre) | 530 | 530 | 540 | 550 | 535 | 520 | 525 | 535 |
| Formol nitrogen (mls./litre) | 143 | 147 | 151 | 139 | 141 | 137 | 147 | 147 |
| Q. F. (° P.) | 2.3 | 2.2 | 2.0 | 1.9 | 1.8 | 1.55 | 1.35 | 1.3 |
| Attenuation (percent) | 77.2 | 78.2 | 80.3 | 81.1 | 82.0 | 84.4 | 86.6 | 87.0 |
| pH | 5.4 | 5.5 | 5.5 | 5.55 | 5.5 | 5.5 | 5.5 | 5.5 |
| Conversion [a] | 3 | 4 | 4 | 3 | 3 | 3 | 4 | 4 |
| Run-off clarity [b] | 3 | 3 | 3 | 3 | 3 | 3 | 3 | 4 |
| Run-off time (mins.) | 35 | 35 | 35 | 35 | 30 | 35 | 35 | 40 |

| Amylase (μ./gm. barley) | 100 | | | | | | | |
|---|---|---|---|---|---|---|---|---|
| Protease μ./gm. barley | 0.6 | | | | | | | |
| Diazyme (A. G./100 gms. barley) | 0 | 10 | 20 | 40 | 80 | 150 | 250 | 350 |
| Wort properties: | | | | | | | | |
| Wort extract (° P) | 10.35 | 10.3 | 10.2 | 10.3 | 10.35 | 10.25 | 10.3 | 10.2 |
| Total nitrogen (mls./litre) | 700 | 650 | 685 | 705 | 700 | 690 | 690 | 715 |
| Formol nitrogen (mls./litre) | 210 | 214 | 210 | 217 | 206 | 201 | 214 | 206 |
| Q. F. (° P.) | 2.25 | 2.1 | 2.0 | 1.9 | 1.7 | 1.5 | 1.3 | 1.2 |
| Attenuation (percent) | 78.3 | 79.6 | 80.4 | 81.6 | 83.6 | 85.4 | 87.4 | 88.2 |
| pH | 5.55 | 5.5 | 5.5 | 5.5 | 5.5 | 5.5 | 5.5 | 5.5 |
| Conversion [a] | 2 | 2 | 2 | 1 | 1 | 1 | 1 | 2 |
| Run-off clarity [b] | 5 | 5 | 5 | 4 | 5 | 5 | 5 | 4 |
| Run-off time (mins.) | 30 | 30 | 30 | 35 | 35 | 30 | 35 | 35 |

| Amylase (μ./gm. barley) | 100 | | | | | | | |
|---|---|---|---|---|---|---|---|---|
| Protease μ./gm. barley | 1.32 | | | | | | | |
| Diazyme (A. G./100 gms. barley) | 0 | 10 | 20 | 40 | 80 | 150 | 250 | 350 |
| Wort properties: | | | | | | | | |
| Wort extract (° P) | 10.7 | 10.8 | 10.75 | 10.7 | 10.7 | 10.6 | 10.6 | 10.65 |
| Total nitrogen (mls./litre) | 850 | 830 | 855 | 860 | 860 | 845 | 860 | 830 |
| Formol nitrogen (mls./litre) | 238 | 246 | 236 | 242 | 242 | 246 | 249 | 236 |
| Q. F. (° P.) | 1.9 | 2.0 | 1.9 | 1.8 | 1.55 | 1.4 | 1.2 | 1.15 |
| Attenuation (percent) | 82.2 | 81.5 | 82.3 | 83.2 | 85.5 | 86.8 | 88.7 | 89.2 |
| pH | 5.55 | 5.55 | 5.55 | 5.5 | 5.6 | 5.5 | 5.5 | 5.4 |
| Conversion [a] | 1 | 1 | 1 | 1 | 1 | 1 | 1 | 1 |
| Run-off clarity [b] | 5 | 5 | 5 | 5 | 5 | 5 | 5 | 4 |
| Run-off time (mins.) | 30 | 30 | 30 | 30 | 30 | 35 | 35 | 35 |

| Amylase (μ./gm. barley) | 100 | | | | | | | |
|---|---|---|---|---|---|---|---|---|
| Protease μ./gm. barley | 2.16 | | | | | | | |
| Diazyme (A. G./100 gms. barley) | 0 | 10 | 20 | 40 | 80 | 150 | 250 | 350 |
| Wort properties: | | | | | | | | |
| Wort extract (° P) | 10.9 | 10.95 | 10.9 | 10.85 | 11.0 | 10.8 | 10.9 | 10.85 |
| Total nitrogen (mls./litre) | 1,060 | 1,035 | 1,050 | 1,050 | 1,075 | 1,080 | 1,060 | 1,060 |
| Formol nitrogen (mls./litre) | 286 | 280 | 286 | 290 | 278 | 278 | 292 | 280 |
| Q. F. (° P.) | 2.15 | 2.0 | 1.9 | 1.7 | 1.6 | 1.35 | 1.3 | 1.2 |
| Attenuation (percent) | 80.3 | 81.7 | 82.6 | 84.3 | 85.5 | 87.1 | 88.1 | 88.9 |
| pH | 5.6 | 5.5 | 5.55 | 5.55 | 5.55 | 5.55 | 5.55 | 5.55 |
| Conversion [a] | 1 | 1 | 1 | 1 | 1 | 1 | 1 | 1 |
| Run-off clarity [b] | 5 | 5 | 5 | 5 | 4 | 5 | 4 | 4 |
| Run-off time (mins.) | 30 | 35 | 30 | 30 | 30 | 35 | 35 | 35 |

| Amylase (μ./gm. barley) | 114 | | | | | | | |
|---|---|---|---|---|---|---|---|---|
| Protease (μ./gm. barley) | 0.128 | | | | | | | |
| Diazyme (A.G./100 gms. barley) | 0 | 10 | 20 | 40 | 80 | 150 | 250 | 350 |
| Wort properties: | | | | | | | | |
| Wort extract (° P.) | 10.1 | 10.0 | 10.2 | 10.1 | 10.1 | 10.05 | 10.2 | 10.1 |
| Total nitrogen (mg./litre) | 530 | 550 | 530 | 540 | 540 | 525 | 550 | 530 |
| Formol nitrogen (mg./litre) | 146 | 152 | 143 | 146 | 146 | 156 | 143 | 149 |
| Q. F. (° P.) | 2.4 | 2.3 | 2.1 | 2.0 | 1.85 | 1.55 | 1.45 | 1.3 |
| Attenuation (percent) | 76.2 | 77.0 | 79.4 | 80.2 | 81.7 | 84.6 | 85.8 | 87.1 |
| pH | 5.6 | 5.55 | 5.55 | 5.55 | 5.55 | 5.6 | 5.6 | 5.6 |
| Conversion [a] | 1 | 1 | 1 | 2 | 2 | 2 | 2 | 2 |
| Run-off clarity [b] | 4 | 4 | 4 | 4 | 4 | 4 | 4 | 4 |
| Run-off time (mins.) | 35 | 35 | 40 | 35 | 40 | 35 | 40 | 40 |

| Amylase (μ./gm. barley) | 114 | | | | | | | |
|---|---|---|---|---|---|---|---|---|
| Protease (μ./gm. barley) | 0.68 | | | | | | | |
| Diazyme (A.G./100 gms. barley) | 0 | 10 | 20 | 40 | 80 | 150 | 250 | 350 |
| Wort properties: | | | | | | | | |
| Wort extract (° P.) | 10.3 | 10.3 | 10.1 | 10.3 | 10.2 | 10.1 | 10.1 | 10.1 |
| Total nitrogen (mg./litre) | 780 | 790 | 775 | 800 | 810 | 780 | 795 | 765 |
| Formol nitrogen (mg./litre) | 220 | 224 | 218 | 227 | 220 | 214 | 227 | 230 |
| Q. F. (° P.) | 2.2 | 2.1 | 2.0 | 1.85 | 1.7 | 1.45 | 1.3 | 1.3 |
| Attenuation (percent) | 78.6 | 79.6 | 80.2 | 82.0 | 83.3 | 85.8 | 87.1 | 87.1 |
| pH | 5.6 | 5.55 | 5.6 | 5.6 | 5.6 | 5.6 | 5.6 | 5.6 |
| Conversion [a] | 1 | 1 | 1 | 1 | 1 | 1 | 1 | 1 |
| Run-off clarity [b] | 4 | 5 | 5 | 5 | 5 | 4 | 4 | 4 |
| Run-off time (mins.) | 35 | 30 | 30 | 30 | 30 | 30 | 30 | 30 |

| Amylase (μ./gm. barley) | 114 | | | | | | | |
|---|---|---|---|---|---|---|---|---|
| Protease (μ./gm. barley) | 1.62 | | | | | | | |
| Diazyme (A.G./100 gms. barley) | 0 | 10 | 20 | 40 | 80 | 150 | 250 | 350 |
| Wort properties: | | | | | | | | |
| Wort extract (° P.) | 10.7 | 10.6 | 10.8 | 10.7 | 10.7 | 10.6 | 10.7 | 10.7 |
| Total nitrogen (mg./litre) | 840 | 840 | 855 | 860 | 825 | 835 | 840 | 865 |
| Formol nitrogen (mg./litre) | 249 | 257 | 252 | 247 | 252 | 244 | 252 | 247 |
| Q. F. (° P.) | 2.15 | 2.0 | 1.9 | 1.75 | 1.6 | 1.35 | 1.3 | 1.3 |
| Attenuation (percent) | 79.9 | 81.1 | 82.4 | 83.6 | 85.0 | 87.3 | 87.9 | 88.7 |
| pH | 5.55 | 5.55 | 5.55 | 5.55 | 5.55 | 5.6 | 5.6 | 5.55 |
| Conversion [a] | 1 | 1 | 1 | 1 | 1 | 2 | 1 | 1 |
| Run-off clarity [b] | 5 | 5 | 5 | 5 | 5 | 5 | 4 | 4 |
| Run-off time (mins.) | 30 | 30 | 30 | 30 | 30 | 30 | 35 | 30 |

| Amylase (μ./gm. barley) | 114 | | | | | | | |
|---|---|---|---|---|---|---|---|---|
| Protease (μ./gm. barley) | 2.47 | | | | | | | |
| Diazyme (A.G./100 gms. barley) | 0 | 10 | 20 | 40 | 80 | 150 | 250 | 350 |
| Wort properties: | | | | | | | | |
| Wort extract (° P.) | 10.8 | 10.75 | 10.9 | 10.8 | 10.8 | 10.9 | 10.8 | 10.8 |
| Total nitrogen (mg./litre) | 1,020 | 1,035 | 1,030 | 1,030 | 1,020 | 1,005 | 1,035 | 1,040 |
| Formol nitrogen (mg./litre) | 285 | 293 | 287 | 285 | 278 | 281 | 285 | 278 |
| Q. F. (° P.) | 2.2 | 2.1 | 1.9 | 1.8 | 1.6 | 1.45 | 1.2 | 1.2 |
| Attenuation (percent) | 79.6 | 80.5 | 82.6 | 83.3 | 85.2 | 86.7 | 88.8 | 89.7 |
| pH | 5.6 | 5.6 | 5.6 | 5.55 | 5.6 | 5.5 | 5.6 | 5.6 |
| Conversion [a] | 1 | 2 | 1 | 1 | 1 | 1 | 1 | 1 |
| Run-off clarity [b] | 5 | 5 | 5 | 5 | 5 | 4 | 4 | 4 |
| Run-off time (mins.) | 30 | 35 | 30 | 30 | 30 | 30 | 30 | 35 |

| Amylase (μ./gm. barley) | 150 | | | | | | | |
|---|---|---|---|---|---|---|---|---|
| Protease (μ./gm. barley) | 0.168 | | | | | | | |
| Diazyme (A.G./100 gms. barley) | 0 | 10 | 20 | 40 | 80 | 150 | 250 | 350 |
| Wort properties: | | | | | | | | |
| Wort extract (° P.) | 10.1 | 10.0 | 10.1 | 10.15 | 10.0 | 9.9 | 10.05 | 10.0 |
| Total nitrogen (mg./litre) | 540 | 560 | 540 | 550 | 555 | 530 | 525 | 550 |
| Formol nitrogen (mg./litre) | 150 | 146 | 153 | 148 | 146 | 156 | 146 | 153 |
| Q. F. (° P.) | 2.3 | 2.2 | 2.0 | 1.85 | 1.7 | 1.45 | 1.3 | 1.25 |
| Attenuation (percent) | 77.2 | 78.0 | 80.0 | 81.8 | 83.0 | 85.4 | 87.0 | 87.5 |
| pH | 5.5 | 5.5 | 5.45 | 5.5 | 5.5 | 5.5 | 5.5 | 5.5 |
| Conversion [a] | 4 | 4 | 4 | 5 | 5 | 4 | 5 | 5 |
| Run-off clarity [b] | 2 | 2 | 2 | 3 | 3 | 3 | 2 | 3 |
| Run-off time (mins.) | 35 | 40 | 35 | 35 | 35 | 35 | 35 | 35 |

| Amylase (μ./gm. barley) | 150 | | | | | | | |
|---|---|---|---|---|---|---|---|---|
| Protease (μ./gm. barley) | 0.90 | | | | | | | |
| Diazyme (A.G./100 gms. barley) | 0 | 10 | 20 | 40 | 80 | 150 | 250 | 350 |
| Wort properties: | | | | | | | | |
| Wort extract (° P.) | 10.5 | 10.6 | 10.55 | 10.4 | 10.5 | 10.5 | 10.4 | 10.5 |
| Total nitrogen (mg./litre) | 720 | 750 | 745 | 720 | 725 | 720 | 705 | 745 |
| Formol nitrogen (mg./litre) | 225 | 229 | 232 | 225 | 221 | 218 | 229 | 232 |
| Q. F. (° P.) | 2.2 | 2.0 | 1.9 | 1.8 | 1.6 | 1.4 | 1.25 | 1.2 |
| Attenuation (percent) | 79.0 | 81.1 | 82.0 | 82.7 | 84.8 | 86.6 | 88.0 | 88.6 |
| pH | 5.5 | 5.5 | 5.5 | 5.4 | 5.5 | 5.5 | 5.5 | 5.5 |
| Conversion [a] | 1 | 1 | 1 | 1 | 1 | 1 | 1 | 1 |
| Run-off clarity [b] | 4 | 4 | 5 | 5 | 5 | 5 | 5 | 5 |
| Run-off time (mins.) | 30 | 30 | 30 | 30 | 30 | 30 | 30 | 30 |

| Amylase (μ./gm. barley) | 150 | | | | | | | |
|---|---|---|---|---|---|---|---|---|
| Protease (μ./gm. barley) | 1.99 | | | | | | | |
| Diazyme (A.G./100 gms. barley) | 0 | 10 | 20 | 40 | 80 | 150 | 250 | 350 |
| Wort properties: | | | | | | | | |
| Wort extract (° P.) | 10.7 | 10.75 | 10.8 | 10.6 | 10.7 | 10.7 | 10.6 | 10.6 |
| Total nitrogen (mg./litre) | 850 | 870 | 850 | 865 | 840 | 870 | 875 | 865 |
| Formol nitrogen (mg./litre) | 265 | 274 | 262 | 267 | 269 | 259 | 269 | 274 |
| Q. F. (° P.) | 2.0 | 2.0 | 1.8 | 1.7 | 1.35 | 1.35 | 1.2 | 1.2 |
| Attenuation (percent) | 81.3 | 81.4 | 83.3 | 84.0 | 85.0 | 87.4 | 88.7 | 88.7 |
| pH | 5.5 | 5.4 | 5.4 | 5.5 | 5.55 | 5.55 | 5.5 | 5.5 |
| Conversion [a] | 1 | 1 | 1 | 1 | 1 | 1 | 1 | 1 |
| Run-off clarity [b] | 5 | 5 | 5 | 5 | 5 | 5 | 4 | 5 |
| Run-off time (mins.) | 30 | 30 | 30 | 30 | 30 | 35 | 35 | 35 |

| Amylase (μ./gm. barley) | 150 | | | | | | | |
|---|---|---|---|---|---|---|---|---|
| Protease (μ./gm. barley) | 3.24 | | | | | | | |
| Diazyme (A.G./100 gms. barley) | 0 | 10 | 20 | 40 | 80 | 150 | 250 | 350 |
| Wort properties: | | | | | | | | |
| Wort extract (° P.) | 10.8 | 10.85 | 10.8 | 10.75 | 10.9 | 10.65 | 10.7 | 10.7 |
| Total nitrogen (mg./litre) | 1,120 | 1,100 | 1,095 | 1,120 | 1,130 | 1,100 | 1,135 | 1,115 |
| Formol nitrogen (mg./litre) | 318 | 302 | 297 | 305 | 302 | 299 | 297 | 298 |
| Q. F. (° P.) | 2.15 | 2.0 | 1.85 | 1.7 | 1.55 | 1.3 | 1.2 | 1.2 |
| Attenuation (percent) | 80.1 | 81.6 | 82.9 | 84.2 | 85.8 | 87.8 | 88.8 | 88.8 |
| pH | 5.45 | 5.45 | 5.45 | 5.5 | 5.5 | 5.5 | 5.5 | 5.5 |
| Conversion [a] | 1 | 1 | 1 | 1 | 1 | 1 | 1 | 1 |
| Run-off clarity [b] | 5 | 5 | 5 | 5 | 5 | 5 | 5 | 5 |
| Run-off time (mins.) | 30 | 35 | 35 | 35 | 30 | 30 | 30 | 30 |

TABLE X—Continued

| | Results | | | | | | |
|---|---|---|---|---|---|---|---|
| Malt controls No | 1 | 2 | 3 | 4 | 5 | 6 | Mean |
| Wort properties: | | | | | | | |
| Wort extract (° P.) | 10.3 | 10.7 | 10.4 | 10.5 | 10.45 | 10.8 | 10.5 |
| Total nitrogen (mg./litre) | 850 | 820 | 770 | 745 | 810 | 820 | 802 |
| Formol nitrogen (mg./litre) | 200 | 212 | 217 | 248 | 262 | 246 | 235 |
| Q.F. (° P.) | 2.25 | 2.35 | 2.1 | 2.05 | 1.7 | 2.1 | 2.1 |
| Attenuation (percent) | 78.2 | 78.0 | 79.8 | 80.5 | 81.8 | 80.5 | 79.8 |
| pH | 5.5 | 5.5 | 5.5 | 5.5 | 5.55 | 5.55 | 5.5 |
| Conversion [a] | 1 | 2 | 1 | 1 | 1 | 1 | 1 |
| Run-off clarity [b] | 4 | 5 | 5 | 4 | 4 | 4 | 4.5 |
| Run-off time (mins.) | 30 | 30 | 35 | 30 | 30 | 30 | 31 |

[a] Conversion scale (Iodine color test): 1=clear, 10=purple.
[b] Clarity scale: 1=murky-cloudy, 5=clear-bright.

Conclusions

Figure 9:
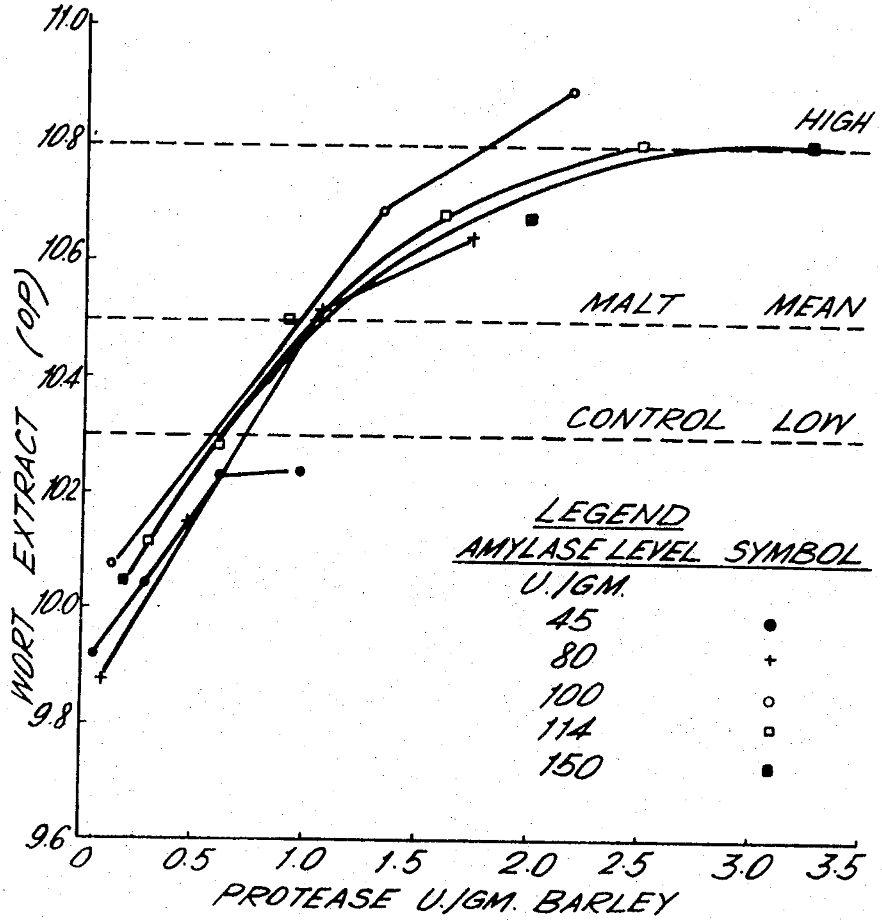
FIGS. 9 to 11 are graphs showing the relationship of different wort properties to varying levels of different enzyme systems used in a process according to this invention.
Figure 10:
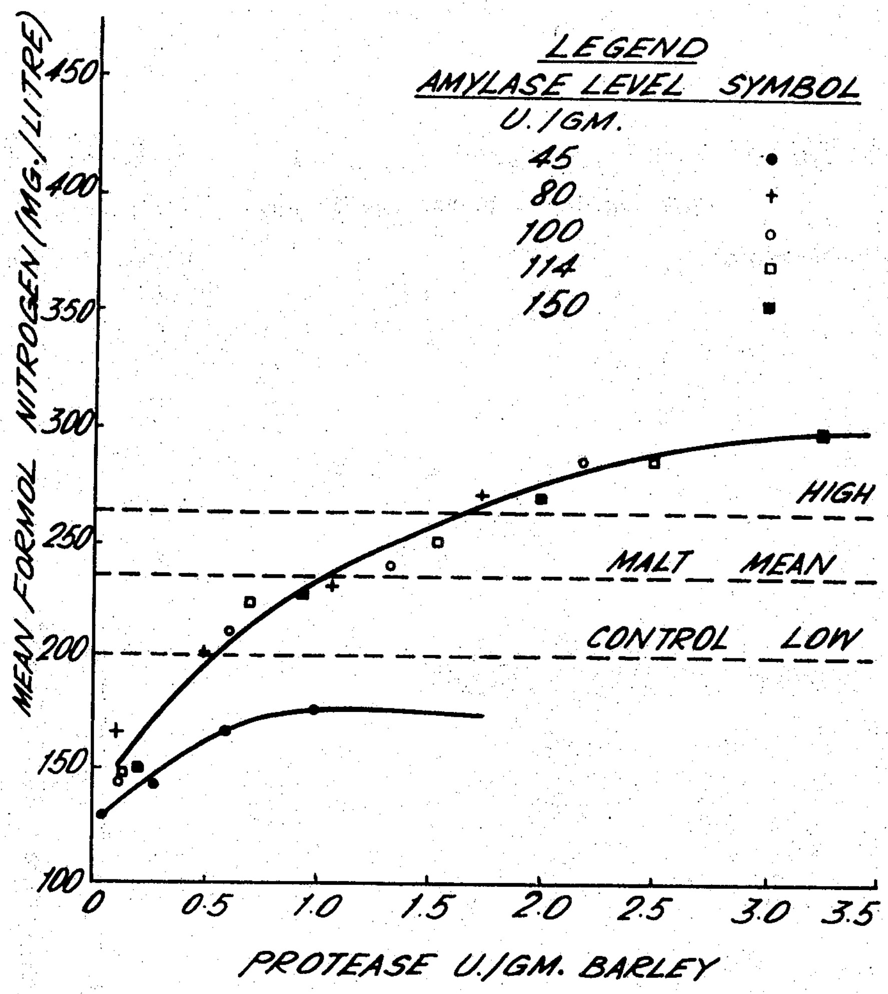
Figure 11:
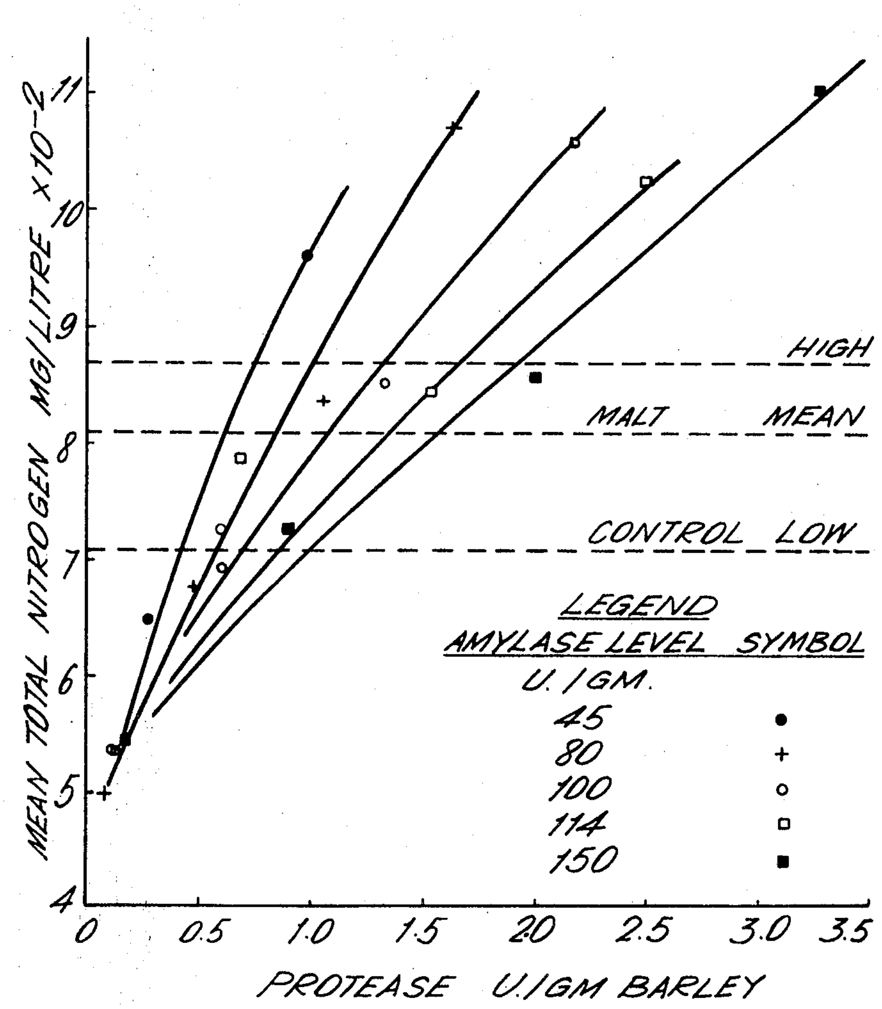
Figure 12A:
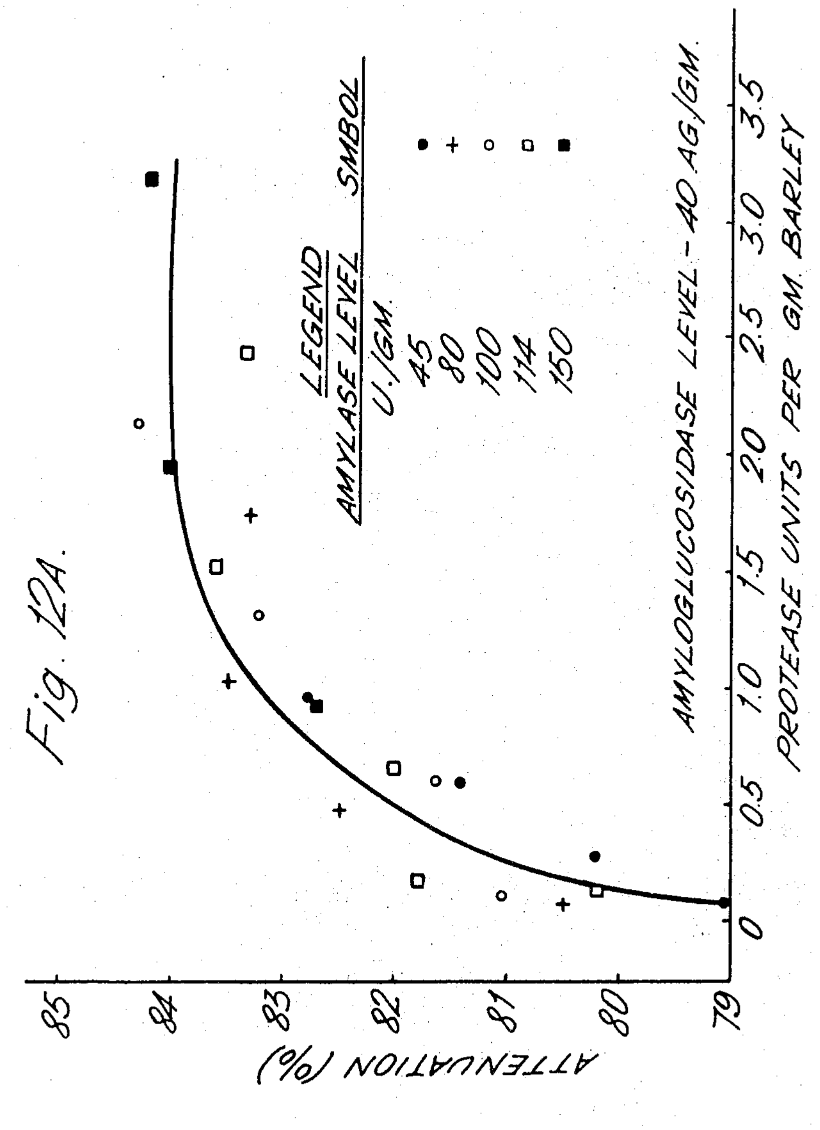
FIGS. 12A and B are graphs showing the relationship of a wort property to varying levels of different enzyme systems in a process according to this invention.
Figure 12B:
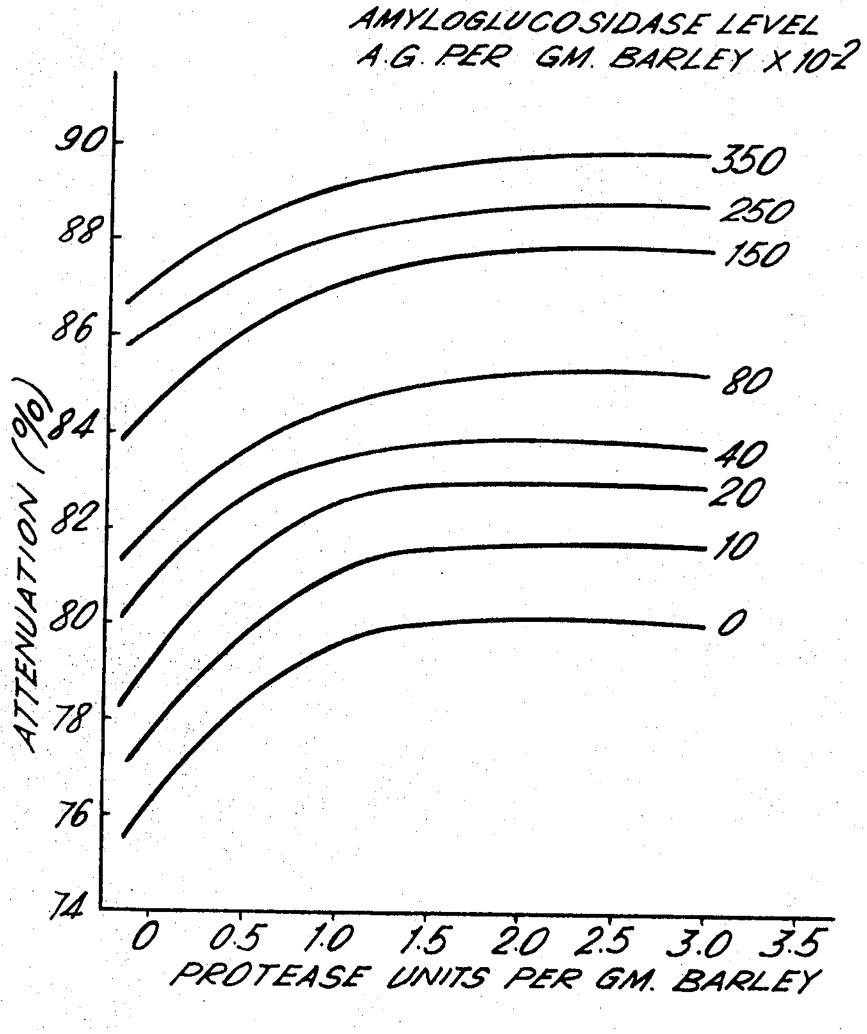

The relationship between wort extract (° P.), formol nitrogen and total nitrogen contents and enzyme levels (protease and amylase) are illustrated in the graphs of FIGS. 9 to 11 respectively and the relationship between attenuation and enzyme levels (protease and amyloglucosidase) is illustrated in the graphs of FIGS. 12A and 12B of the accompanying drawings. Referring to FIGS. 9 to 11, these show the variations in mean wort extract, formol nitrogen and total nitrogen values respectively for increasing protease content at the fixed-amylase levels increasing from 45 α-amylase units to 150 α-amylase units per gm. FIGS. 9 and 10 indicate that to attain wort extract and formol nitrogen values comparable to those of the malt controls it is necessary to work at α-amylase levels in excess of 45 α-amylase units per gm. and protease levels in excess of 0.5, preferably 0.9, protease units per gm. These graphs also show that at protease levels in excess of 2–2.5 units per gm., there is little further improvement in wort extract and formol nitrogen content. It is also significant to find that the wort extract values appear to be correlated to, and influenced by, the amylase level in that the highest values are obtained with an amylase level of 100 units per gm. barley and not, as would be expected, with the 150 amylase units level. However, as shown, both the 114 and 150 amylate units curves are displaced below the 100 amylase units curve. The variation of the total nitrogen content of the worts with increasing protease level is shown in FIG. 11, which indicates that the total nitrogen content increases with increasing protease levels. However, surprisingly, at a given protease level, the total nitrogen content increases with decreasing amylase level; for example, at 1.0 protease units per gm. barley, 150 amylase units per gm. give a total nitrogen value of 700 mg./litre, while 100 amylase units per gm. give 790 mg./litre. Hence, to obtain a given total nitrogen value, a higher protease level is apparently needed with increasing amylase level.

In FIG. 12A, the variation in attenuation (percent) is plotted against increasing protease levels for the five α-amylase levels varying from 45 to 150 α-amylase units per gm. with the Diazyme level fixed at 40 A.G. units per 100 gms. barley. Referring to this graph, the various data points are well correlated by the curve shown. This graph indicates that at the various α-amylase levels studied the attenuation increases with increasing protease level to around 2 protease units per gm. beyond which there is no further improvement in attenuation. This finding is essentially confirmed by FIG. 12B, in which curves similar to that of FIG. 12A are plotted for Diazyme levels varying from 0 to 350 A.G. units per 100 gms. barley (the data points have been omitted for the sake of clarity).

EXAMPLE 9

The procedure of the foregoing example was repeated using the same raw materials except that the mash bill used was similar to that of Example 7, i.e. 18% by weight malt instead of 10%.

Results

The worts so-obtained were analyzed for the same properties as the worts of the foregoing example and graphs corresponding to FIG. 9 to 12B plotted. These graphs showed essentially the same relationship between protease, amylase and amyloglucosidase levels and wort properties.

EXAMPLE 10

The procedure of Example 5 was repeated, again under actual brewery conditions, with different mash bills and enzyme systems as summarized in the following Table XI, which also includes the results of analyses on the worts and beers so-obtained as well as the corresponding data for a conventional malt wort and beer serving as the control.

TABLE XI

| Run Number | B-40 | B-44 | B-43 | B-42 | B-41 | B-31 | B-32 |
|---|---|---|---|---|---|---|---|
| Mash bill: | | | | | | | |
| Barley (gms.) | 6,145 | 6,145 | 6,145 | 6,145 | 6,145 | 6,145 | -------- |
| Malt (gms.) | 1,230 | 1,230 | 1,230 | 1,230 | 1,230 | 1,230 | 6,510 |
| Corn (gms.) | 2,700 | 2,700 | 2,700 | 2,700 | 2,700 | 2,700 | 2,555 |
| Ratio: | | | | | | | |
| Barley (percent) | 100 | 100 | 100 | 100 | 100 | 100 | -------- |
| Corn (percent) | 44 | 44 | 44 | 44 | 44 | 44 | -------- |
| Malt (percent) | 20 | 20 | 20 | 20 | 20 | 20 | -------- |
| | 1 | 2 | 3 | 4 | 5 | 6 | Malt control |
| Enzyme System No.: [a] | | | | | | | |
| Amylase μ./ml | 3,600 | 7,945 | 8,625 | 8,775 | 7,670 | 33,980 | -------- |
| Protease μ./ml | 30 | 60 | 93.8 | 62.5 | 70 | 235 | -------- |
| Diazyme μ./gm | | 160 | 160 | 160 | 160 | 160 | -------- |
| Amylase:Protease | 120:1 | 132:1 | 92:1 | 140:1 | 110:1 | 130:1 | -------- |
| Amylase μ./gm. barley | 114 | 114 | 114 | 114 | 114 | 114 | -------- |
| Protease μ./gm. barley | 0.95 | 0.86 | 1.24 | 6.81 | 1.0 | 0.92 | -------- |
| Diazyme μ./gm. barley×$10^2$ | | 11.4 | 22.9 | 34.3 | 45.7 | 46.7 | -------- |
| Wort analysis: | | | | | | | |
| Made up extract (° P.) | 10.4 | 10.6 | 10.6 | 10.4 | 10.5 | 10.65 | 10.4 |
| Kettle extract (° P.) | 11.9 | 11.8 | 12.0 | 11.8 | 11.9 | 12.05 | 12.0 |
| Q.F | 3.0 | 2.7 | 2.6 | 2.5 | 2.3 | 2.3 | 2.6 |
| Total nitrogen (mg./litre) | 879 | 865 | 893 | 893 | 872 | 921 | 868 |
| Formol nitrogen (mg./litre) | 252 | 246 | 255 | 252 | 258 | 258 | 272 |
| pH | 4.2 | 4.35 | 4.25 | 4.3 | 4.3 | 4.25 | 4.15 |
| Apparent attenuation (percent) | 74.8 | 77.1 | 78.3 | 78.8 | 80.7 | 80.9 | 79.0 |
| Beer analysis: | | | | | | | |
| Air (ml.) | 1.5 | 0.1 | 0.7 | 0.5 | 0.2 | N.D. | N.D. |
| $CO_2$ (vol.) | 2.7 | 2.44 | 2.6 | 2.89 | 2.58 | N.D. | N.D. |
| Color SRM | 2.9 | 2.4 | 2.4 | 2.4 | 2.5 | 2.7 | 2.4 |
| Foam SIG | 135 | 115 | 121 | 123 | 120 | 126 | 125 |
| App. ext. (percent) | 2.3 | 2.3 | 2.3 | 2.2 | 2.1 | 2.0 | 2.1 |
| pH | 4.2 | 4.35 | 4.3 | 4.3 | 4.35 | 4.3 | 4.25 |
| Formol nitrogen (mg./litre) | 205 | 232 | 227 | 216 | 216 | 216 | 222 |
| $SO_2$ | 8.0 | 3.0 | 6.0 | 8.0 | 4.0 | 2.0 | 4.0 |
| Diacetyl (p.p.m.) | 0.06 | 0.25 | 0.24 | 0.29 | 0.38 | 0.40 | 0.19 |
| Iron (p.p.m.) | 0.09 | 0.05 | 0.06 | 0.08 | 0.05 | 0.04 | 0.05 |

TABLE XI—Continued

| | 1 | 2 | 3 | 4 | 5 | 6 | Malt control |
|---|---|---|---|---|---|---|---|
| Beer analysis: | | | | | | | |
| Copper (p.p.m.) | 0.16 | 0.05 | 0.16 | 0.05 | 0.11 | 0.16 | 0.11 |
| Protein (percent) | 0.37 | 0.49 | 0.33 | 0.34 | 0.34 | 0.31 | 0.33 |
| Acidity (percent) | 0.17 | 0.18 | 0.17 | 0.17 | 0.17 | 0.17 | 0.17 |
| Isohumulones (IBU) | 15 | 17 | 16 | 16 | 18 | 18 | 18 |
| Real extract (percent) | 4.13 | 4.04 | 3.82 | 4.14 | 3.88 | 4.03 | 4.10 |
| Alcohol (percent wt.) | 3.83 | 3.99 | 3.93 | 3.96 | 4.0 | 4.04 | 3.90 |
| Alcohol (percent wt.) | 4.89 | 5.10 | 5.02 | 5.05 | 5.11 | 5.17 | 5.05 |
| Calc. orig. extract (percent) | 11.6 | 11.8 | 11.5 | 11.8 | 11.7 | 11.9 | 11.4 |
| Yeast ferm. ext. (percent) | 0 | 0 | 0 | 0 | 0 | 0 | 0 |
| Initial sediment rating | 1.0 | 1.0 | 1.0 | 1.0 | 0 | 1.0 | 1.0 |
| Initial chill haze | 70 | 55 | 55 | 50 | 60 | 75 | 60 |
| Force haze test (1 Week Rad-F.T.U.) | 80 | 160 | 120 | 120 | 130 | 140 | 180 |

[a] Enzyme system: Enzyme Systems #1 to 5 (Runs #B-40 to 44) were in the form of enzyme complexes derived from the cultivation of *Bacillus subtilis* ATCC 21556 following a similar procedure to that set forth in Example 2 in the aforementioned co-pending application and containing both neutral and alkaline protease. Enzyme system #6 (Run B-31) was derived by blending together 56 ml. "Tenase" (commercially available from Miles Laboratories) assaying at 14,300 amylase units/ml. and 20 gm. "HTP 200" (also commercially availablef rom Miles Laboratories) assaying at 19,680 amylase units/gm. and 412 protease units/gm. including 193 neutral amylase units/gm. and 219 alkaline protease units/gm.

Conclusions

The results indicate that the barley/enzyme worts and beers had substantially similar physico-chemical properties to the conventional malt control. Taste tests conducted on the various beers showed that all were acceptable, with a slightly higher preference score for the beer of Run B-42. All the beers were found to be clean and neutral in aroma with a moderate to full-bodies taste and mild to moderate hop character.

EXAMPLE 11

In this example, various commercially available enzymes were blended together in defined proportions to provide different enzyme systems each of which was then used to convert a given grain bill into a brewers' wort employing laboratory mash units (fitted with cooker and mash mixer cups) and following basically the procedure of Example 6 herein.

PART A (i) Grain bill

| | Gms. |
|---|---|
| Barley (100%) | 60 |
| Corn (54%) | 32.4 |
| Malt (12%) | 7.2 |

(ii) Enzyme system

| | |
|---|---|
| Amylase: | |
| Tenase (Miles) | |
| Amylase activity (u./ml.) | 14100 |
| Amylase level (u./gm. barley) | 100 |
| Volume (percent of barley), v./w. | 0.7 |
| Protease: | |
| Ficin | |
| Protease activity (u./gm.) | 543.6 |
| Protease level (u./gm. barley) | 0.9 |
| Weight (percent of barley), w./w. | 0.16 |
| Amylase: Protease | 111:1 |
| Amyloglucosidase: | |
| Diazyme (Miles) | |
| A.G. activity (u./gm.) | 160 |
| A.G. level (u./gm. barley) | 0.40 |
| Weight (percent of barley), w./w. | 0.25 |

PART B (i) Grain bill

| | Gms. |
|---|---|
| Barley (100%) | 66.4 |
| Corn (44%) | 29.2 |
| Malt (8%) | 5.8 |

(ii) Enzyme system

| | |
|---|---|
| Tenase (Miles) | |
| Amylase activity (u./ml.) | 14100 |
| Amylase level (u./gm. barley) | 128 |
| Volume (percent of barley), v./w. | 0.9 |
| Protease: | |
| Ficin | |
| Protease activity (u./gm.) | 543.6 |
| Protease level (u./gm. barley) | 1.5 |
| Weight (percent of barley), w./w. | 0.27 |
| Amylase:Protease | 85:1 |
| Amyloglucosidase: | |
| Diazyme (Miles) | |
| A.G. activity (u./gm.) | 160 |
| A.G. level of (u./gm. barley) | 0.8 |
| Weight of (percent of barley), w./w. | 0.5 |

PART C (i) Grain bill

| | Gms. |
|---|---|
| Barley (100%) | 62.0 |
| Corn (44%) | 27.9 |
| Malt (18%) | 11.2 |

(ii) Enzyme system

| | |
|---|---|
| Amylase: | |
| Tenase (Miles) | |
| Amylase activity (u.ml.) | 14100 |
| Amylase level (u./gm. barley) | 150 |
| Volume (percent of barley), v./w. | 1.06 |
| Protease: | |
| Bromelain | |
| Protease activity (u./gm.) | 203.5 |
| Protease level (u./gm. barley) | 1.1 |
| Weight (percent of barley), w./w. | 0.5 |
| Amylase:Protease | 136:1 |
| Amyloglucosidase: | |
| Diazyme (Miles) | |
| A.G. activity (u./gm.) | 160 |
| A.G. level (u./gm. barley) | 0.6 |
| Weight (percent of barley), w./w. | 0.37 |

PART D (i) Grain bill

| | Gms. |
|---|---|
| Barley (100%) | 62.0 |
| Corn (44%) | 27.9 |
| Malt (18%) | 11.2 |

(ii) Enzyme system

| | |
|---|---|
| Amylase: | |
| HT 1000 (Miles) | |
| Amylase activity (u./gm.) | 55,400 |
| Amylase level (u./gm. barley) | 114 |
| Weight (percent of barley), w./w. | 0.2 |
| Protease: | |
| Bromelain | |
| Protease activity (u./gm.) | 203.5 |
| Protease level (u./gm. barley) | 0.9 |
| Weight (percent of barley), w./w. | 0.4 |
| Amylase:Protease | 127:1 |

| | |
|---|---|
| Amyloglucosidase: | |
| Grain processing glucoamylase | |
| A.G. Activity (u./ml.) | 40 |
| A.G. level (u./gm. barley) | 0.8 |
| Volume (percent of barley), v./w. | 2.0 |

PART E (i) Grain bill

| | Gms. |
|---|---|
| Barley (100%) | 64.4 |
| Corn (48%) | 30.9 |
| Malt (8%) | 5.1 |

(ii) Enzyme system

| | |
|---|---|
| Amylase: | |
| Novo bacterial amylase | |
| Amylase activity (u./gm.) | 9500 |
| Amylase level (u./gm. barley) | 128 |
| Weight (percent of barley), w./w. | 1.34 |
| Protease: | |
| Ficin | |
| Protease activity (u./gm.) | 543.6 |
| Protease level (u./gm. barley) | 0.9 |
| Weight (percent of barley), w./w. | 0.16 |
| Amylase: Protease | 142:1 |
| Amyloglucosidase: | |
| Distillers glucoamylase (Miles) | |
| Amylase activity (u./ml.) | 100 |
| Amylase level (u./gm. barley) | 0.4 |
| Volume (percent of barley), v./w. | 0.4 |

PART F (i) Grain bill

| | Gms. |
|---|---|
| Barley (100%) | 60 |
| Corn (54%) | 32.4 |
| Malt (12%) | 7.2 |

(ii) Enzyme system

| | |
|---|---|
| Amylase: | |
| HT 1000 (Miles) | |
| Amylase activity (u./gm.) | 55,400 |
| Amylase level (u./gm. barley) | 128 |
| Weight (percent of barley), w./w. | 0.2 |
| Protease: | |
| Bromelain | |
| Protease activity (u./gm.) | 203.5 |
| Protease level (u./gm. barley) | 1.1 |
| Weight (percent of barley), w./w. | 0.5 |
| Amylase:Protease | 116:1 |
| Amyloglucosidase: | |
| Grain processing glucoamylase | |
| A.G. activity (u./ml.) | 40 |
| A.G. level (u./gm.) barley) | 0.6 |
| Volume (percent of barley) v./w. | 1.5 |

PART G (i) Grain bill

| | Gms. |
|---|---|
| Barley (100%) | 66.4 |
| Corn (44%) | 29.2 |
| Malt (8%) | 5.3 |

(ii) Enzyme system

| | |
|---|---|
| Amylase: | |
| Novo bacterial amylase | |
| Amylase activity (u./gm.) | 9500 |
| Amylase level (u./gm. barley) | 150 |
| Weight (percent of barley), w./w. | 1.5 |
| Protease: | |
| Ficin | |
| Protease activity (u./gm.) | 543.6 |
| Protease level (u./gm. barley) | 1.5 |
| Weight (percent of barley), w./w. | 0.27 |
| Amylase:Protease | 100:1 |
| Amyloglucosidase: | |
| Distillers glucoamylase (Miles) | |
| A.G. activity (u./ml.) | 100 |
| A.G. level (u./gm. barley) | 0.4 |
| Volume (percent of barley), v./w. | 0.4 |

PART H (i) Grain bill

| | Gms. |
|---|---|
| Barley (100%) | 64.4 |
| Corn (48%) | 30.9 |
| Malt (8%) | 5.1 |

(ii) Enzyme system

| | |
|---|---|
| Amylase: | |
| Tenase (Miles) | |
| Amylase activity (u./ml.) | 14100 |
| Amylase level (u./gm. barley) | 100 |
| Volume (percent of barley), v./w. | 0.7 |
| Protease: | |
| Bromelain | |
| Protease activity (u./gm.) | 203.5 |
| Protease level (u./gm. barley) | 1.1 |
| Weight (percent of barley), w./w. | 0.5 |
| Amylase:Protease | 91:1 |
| Amyloclucosidase: | |
| Grain processing glucoamylase | |
| A.G. Activity (u./ml.) | 40 |
| A.G. level (u./gm. barley) | 0.6 |
| Volume (percent of barley), v./w. | 1.5 |

PART I (i) Grain bill

| | Gms. |
|---|---|
| Barley (100%) | 60.0 |
| Corn (54%) | 32.4 |
| Malt (12%) | 7.2 |

(ii) Enzyme system

| | |
|---|---|
| Amylase: | |
| HTP 200 (Miles) | |
| Amylase activity (u./gm.) | 19680 |
| Amylase level (u./gm. barley) | 128 |
| Weight (percent of barley), w./w. | 0.65 |
| Protease: | |
| HTP 200 (Miles) [1] | |
| Protease activity (u./gm.) | 235 |
| Protease level (u./gm. barley) | 1.5 |
| Weight (percent of barley), w./w. | 0.6 |
| Amylase:Protease | 85:1 |

[1] HTP 200 possesses both amylase and protease activity.

| | |
|---|---|
| Amyloglucosidase: | |
| Distillers glucoamylase (Miles) | |
| A.G. activity (u./ml.) | 100 |
| A.G. level (u./gm. barley) | 0.8 |
| Volume (percent of barley), v.w. | 0.8 |

PART J (i) Grain bill

| | Gms. |
|---|---|
| Barley (100%) | 64.4 |
| Corn (48%) | 30.9 |
| Malt (8%) | 5.1 |

(ii) Enzyme system

| | |
|---|---|
| HTP 200 (Miles) | |
| Amylase activity (u./gm.) | 19680 |
| Amylase level (u./gm. barley) | 128 |
| Weight (percent of barley), w./w. | 0.65 |
| Protease: | |
| HTP 200 (Miles) | |
| Protease activity (u.gm.) | 2350 |
| Protease level (u. gm. barley) | 1.5 |
| Weight (percent of barley) | 0.6 |
| Amylase:Protease | 85:1 |

Amyloglucosidase:
 Diazyme (Miles)
 A.G. activity (u./gm.) ---- 160
 A.G. level (u./gm. barley) ---- 0.8
 Weight (percent of barley), w./w. ---- 0.5

In each of Part A to J, the corn was liquefied in the cooker using 12% by weight ground malt.

Results

Data from the analysis of the brewers' wort obtained from each of Part A to J and a control malt wort run under identical process conditions (68 gms. malt:26 gms. corn) is summarized in Table XII below:

TABLE XII

| | Part | | | | | | | | | | Malt control |
|---|---|---|---|---|---|---|---|---|---|---|---|
| | A | B | C | D | E | F | G | H | I | J | |
| Wort property: | | | | | | | | | | | |
| Wort extract (° P.) | 10.4 | 10.6 | 10.4 | 10.2 | 10.5 | 10.7 | 10.7 | 10.4 | 10.65 | 10.6 | 10.5 |
| Total nitrogen (mg./litre) | 760 | 820 | 760 | 775 | 780 | 805 | 800 | 820 | 800 | 794 | 822 |
| Formol nitrogen (mg./litre) | 238 | 260 | 245 | 242 | 233 | 238 | 270 | 242 | 260 | 255 | 250 |
| pH | 5.3 | 5.4 | 5.4 | 5.35 | 5.3 | 5.4 | 5.4 | 5.3 | 5.4 | 5.3 | 5.3 |
| Q.F. (° P.) | 1.8 | 1.65 | 1.85 | 1.6 | 1.85 | 1.7 | 1.8 | 1.7 | 1.65 | 1.7 | 2.4 |
| Apparent attenuation (percent) | 82.7 | 84.4 | 82.2 | 84.3 | 82.4 | 84.1 | 83.2 | 83.6 | 84.5 | 84.0 | 77.1 |
| Conversion [a] | 1 | 1 | 1 | 1 | 1 | 1 | 1 | 1 | 1 | 1 | 1 |
| Run-off clarity [b] | 4 | 5 | 4 | 4 | 5 | 5 | 4 | 4 | 4 | 4 | 4 |
| Run-off time (mins.) | 30 | 30 | 30 | 30 | 35 | 30 | 30 | 30 | 35 | 30 | 35 |

[a] Conversion scale (Iodine color test): 1=clear, 10=purple.
[b] Clarity scale: 1=murky-cloudy, 5=clear-bright.

The brewers' wort obtained in each of Parts A to J was fermented into a beer with an acceptable taste, aroma, color and stability.

EXAMPLE 12

This example illustrates the effects of varying the malt level on wort properties.

Basically, the laboratory scale procedure of Example 6 hereinbefore was used to convert the following mash bills with an enzyme system formed by intimately blending together a discrete amylase/protease mixture assaying at 6370 modified Stein-Fischer $\alpha$-amylase units per ml. and 45 modified Kunitz protease units per ml. and obtained following a similar procedure to that set forth in Example 1 of the aforementioned co-pending application and Diazyme (LD-30) assaying at 30 A.G. per ml. This enzyme system was used in an amount of 0.0195 ml. per gm. barley giving 100 $\alpha$-amylase units, 0.7 protease units and 0.47 A.G. units per gm. barley.

| Part A: | Percent by wt. |
|---|---|
| Barley | 100 |
| Corn | 50.1 |
| Malt | 0 |

Barley:Corn≡66.6:33.4

| Part B: | |
|---|---|
| Barley | 100 |
| Corn | 53.6 |
| Malt | 6 |

Barley:Corn≡65:35

| Part C: | |
|---|---|
| Barley | 100 |
| Corn | 55.86 |
| Malt | 10 |

Barley:Corn≡64.2:35.8

| Part D: | |
|---|---|
| Barley | 100 |
| Corn | 57.0 |
| Malt | 18 |

Barley:Corn≡63.7:36.3

| Part E: | |
|---|---|
| Barley | 100 |
| Corn | 58.0 |
| Malt | 22 |

Barley:Corn≡63.3:36.7

| Part F: | |
|---|---|
| Barley | 100 |
| Corn | 59.0 |
| Malt | 25 |

Barley:Corn≡63:37

Results

The worts so-obtained were analyzed and the data obtained is summarised in Table XIII which follows:

TABLE XIII

| | Part | | | | | |
|---|---|---|---|---|---|---|
| | A | B | C | D | E | F |
| Wort property: | | | | | | |
| Extract (° P.) | 10.5 | 10.5 | 10.65 | 10.6 | 10.55 | 10.6 |
| Q.F. | 2.15 | 2.0 | 1.8 | 1.7 | 1.8 | 1.75 |
| Formol nitrogen (mg./litre) | 185 | 199 | 210 | 218 | 220 | 220 |
| Attenuation (percent) | 79.5 | 81.0 | 83.1 | 84.0 | 82.9 | 83.5 |

The results show that the wort extract remains essentially constant regardless of malt level, though there is a slight peak in Part C (10% malt level); the Q.F. and attenuation tend to improve with increasing malt content to the 18% level with the 22 and 25% malt levels showing no substantial improvement over the 18%.

EXAMPLE 13

This example illustrates the exects of varying temperature and time during the proteolytic reaction period on wort properties.

Basically, the laboratory scale procedure of Example 6 hereinbefore was followed using the same raw materials (mash bill of Part A) except that the enzyme system of the foregoing example was employed in the conversion and the temperature and time for the proteolytic reaction in the mash cycle of FIG. 6 were varied as shown in table below.

Results

The worts so-obtained were analyzed and the data obtained is summarized in Table XIV which follows:

TABLE XIV

| Temperature (° C.) | 36 | 40 | 46 | 46 | 55 |
|---|---|---|---|---|---|
| Time (mins.) | 30 | 60 | 50 | 60 | 30 |
| Wort properties: | | | | | |
| Wort extract (° P.) | 9.9<br>9.85 | 10.3<br>10.2 | 10.55<br>10.5 | 10.4<br>10.4 | 10.2<br>10.3 |
| Q.F. (° P.) | 1.95<br>2.05 | 1.9<br>1.8 | 1.7<br>1.75 | 1.75<br>1.65 | 2.0<br>2.1 |
| Formol nitrogen (mg./litre). | 174<br>173 | 184<br>189 | 205<br>211 | 209<br>203 | 174<br>182 |
| Attenuation (percent) | 80.1<br>79.2 | 81.6<br>81.9 | 83.7<br>83.3 | 83.5<br>83.9 | 80.4<br>79.1 |

The data indicates that the best combination of those properties attributable to protein breakdown is obtained in a proteolytic reaction period conducted at 46° C. for 50 to 60 minutes.

EXAMPLE 14

The example illustrates the effects of varying temperature and time during the solubilization and saccharification of the barley, and shows the advantages of the stepwise heating procedure of a preferred embodiment of this invention.

Basically, the laboratory scale procedure of Example 6 hereinbefore was followed except that the temperature and time for the solubilization and saccharification in the mash cycle of FIG. 6 were varied as shown in Tables XV and XVI which follow. The raw materials used were similar to those used in the foregoing example. Pertinent wort properties obtained from wort analyses are also summarised in these tables.

TABLE XV.—SINGLE STAGE PROCEDURE

| | | | | | |
|---|---|---|---|---|---|
| Temperature (° C.) | 60 | 64 | 71 | 76 | 80 |
| Time (mins.) | 90 | 60 | 60 | 60 | 60 |
| Wort extract (° P.) | 9.9 | 10.2 | 10.2 | 10.1 | 9.8 |
| Q.F. (° P.) | 2.0 | 1.9 | 2.4 | 2.8 | 3.4 |
| Formol nitrogen (mg./litre) | 207 | 211 | 183 | 180 | 152 |
| Attenuation, percent | 79.8 | 81.4 | 76.5 | 72.3 | 65.3 |
| Yield, percent | 90.5 | 93.3 | 93.3 | 92.3 | 89.5 |

TABLE XVI.—STEPWISE (TWO STAGE) PROCEDURE

| | | | | | | | | | | | | | | | | |
|---|---|---|---|---|---|---|---|---|---|---|---|---|---|---|---|---|
| Stage: | | | | | | | | | | | | | | | | |
| Primary: | | | | | | | | | | | | | | | | |
| Temp. (° C.) | 60 | | | | 65 | | | | 65 | | | | 68 | | | |
| Time (mins.) | 45 | | | | 30 | | | | 45 | | | | 45 | | | |
| Secondary: | | | | | | | | | | | | | | | | |
| Temp. (° C.) | 70 | 70 | 74 | 80 | 70 | 70 | 74 | 80 | 70 | 70 | 74 | 80 | 70 | 70 | 74 | 8 |
| Time (mins.) | 15 | 30 | 15 | 15 | 15 | 30 | 15 | 15 | 15 | 30 | 15 | 15 | 15 | 30 | 15 | 15 |
| Wort properties: | | | | | | | | | | | | | | | | |
| Wort extract (° P.) | 9.95 | 10.1 | 10.2 | 10.0 | 10.1 | 10.2 | 10.2 | 9.9 | 10.1 | 10.25 | 10.4 | 10.05 | 9.8 | 9.9 | 10.2 | 9.85 |
| Q.F. (° P.) | 2.4 | 2.15 | 2.0 | 2.2 | 2.0 | 2.1 | 1.85 | 1.95 | 2.1 | 1.95 | 1.8 | 2.0 | 2.2 | 2.0 | 2.05 | 1.9 |
| Formol nitrogen (mg./litre) | 219 | 219 | 214 | 212 | 210 | 221 | 225 | 220 | 214 | 215 | 210 | 208 | 198 | 200 | 211 | 205 |
| Attenuation, percent | 75.9 | 78.7 | 80.4 | 80.0 | 79.2 | 80.4 | 81.9 | 80.3 | 79.2 | 81.0 | 82.7 | 80.1 | 77.6 | 78.8 | 79.9 | 80.7 |
| Yield, percent | 91.0 | 92.3 | 93.3 | 91.4 | 92.3 | 93.3 | 93.3 | 90.5 | 92.3 | 93.8 | 95.3 | 91.9 | 89.5 | 90.5 | 93.3 | 90.0 |

A comparison of the data presented in Tables XV and XVI shows the advantages of the two stage, step-wise heating procedure in giving worts of superior extract, Q.F., formol nitrogen and attenuation values relative to the single-stage procedure involving comparable temperatures and times. For instance, heating at 76° C. for 60 minutes in the single stage procedure gives a wort extract, Q.F., formol nitrogen and attenuation of 10.1, 2.8, 180 and 72.3% respectively compared to 10.4, 1.8, 210 and 82.7% for the two stage procedure with 45 minutes at 65° C. and 15 minutes at 74° C.

EXAMPLE 15

A brewer's wort was prepared following the procedure of Example 5 hereinbefore from a mash bill comprising:

| | Gms. |
|---|---|
| Barley | 11,305 |
| Malt | 1,135 |
| Corn | 5,540 |
| Sodium chloride | 18 |
| Calcium acetate | 9 |
| Water, 60 litres. | |

using the enzyme system of Example 12 hereinbefore at a level of 100 amylase units, 0.7 protease unit, and 0.47 A.G. unit per gm. barley.

The worst so-obtained, which had an extract value of 10.9° P, was divided into two portions.

One of these portions was boiled in an open kettle for 2 hours, at the end of which period it had an extract value of 12.7° P. The boiled wort was cooled, then evaporated in an under reduced pressure to a solids content of about 75%. The resulting concentrate was a thick, easy to handle syrup with a formol nitrogen content of 267 mg./litre. This syrup, diluted to 11° P value, i.e. 11% solids, gave a reconstituted wort with acceptable properties for fermentation into beer.

The other portion of the wort was dried to powder using a spray drier ("Niro" type) operating at an air inlet temperature of 115° C. and an air outlet temperature of 70° C. The product was water soluble and could be dispersed in water, bittered with hops or powdered sodium isohumulate, and pitched with yeast, then fermented in the usual way to give a beer.

Although the present invention has been illustrated with preferred embodiments, it will be understood that modifications and variations may be employed without departing from the spirit and scope of this invention, as those skilled in the art will readily understand. Such variations and modifications are therefore considered to be within the purview and scope of the appended claims.

What is claimed is:

1. In a process for the production of a brewer's wort in which an aqueous mash of unmalted cereal grains is subjected to the action of enzymes whereby proteins present in the unmalted cereal grains are converted into soluble nitrogen-containing compounds and carbohydrates present in the cereal grains are solubilized and converted by saccharification into sugars after which the resulting mash is filtered, the improvement of enhancing the filterability of the mash comprising:

(a) commingling an aqueous slurry of unmalted cereal grains with discrete protease enzyme in an amount effective to convert proteins present in the mash into soluble nitrogen-containing compounds for brewer's wort production but not less than 0.5 modified Kunitz protease units per gram of unmalted cereal grains;

(b) holding the resultant mash at a temperature of between about 40° and about 55° C. for between about 30 and about 240 minutes;

(c) raising the temperature of the mash to between about 60° and about 70° C.;

(d) holding the mash temperature within the range defined in step (c) for between about 30 and about 90 minutes;

(e) adding to the mash discrete α-amylase and amyloglucosidase enzymes and β-amylase enzyme or a source thereof prior to or at the beginning of step (d), the α-amylase being present in an amount effective to liquefy carbohydrates present in the mash for brewer's wort production but not less than 45 modified Stein-Fischer α-amylase units per gram of unmalted cereal grains, the amyloglucosidase being present in an amount effective to convert carbohydrates present in the mash into glucose for brewer's wort production but not less than $6.0 \times 10^{-3}$ amyloglucosidase units per gram of unmalted cereal grains, and the β-amylase being present in an amount equivalent to about 8 to about 30 percent of malt by weight based on the weight of unmalted cereal grains;

(f) raising the mash temperature to between about 70° and about 80° C.;

(g) holding the mash temperature within the range defined in step (f) for between about 10 and about 60 minutes; and (h) separating the wort so-obtained from the solid material.

2. A process as claimed in claim 1, wherein the protease enzyme is present in an amount of at least 0.9 modified Kunitz protease units per gram of unmalted cereal grains, the α-amylase enzyme is present in an amount of at least 100 modified Stein-Fischer α-amylase units per gram of unmalted cereal grains, the amyloglucosidase enzyme is present in an amount between about $1\times10^{-1}$ and about $10\times10^{-1}$ amyloglucosidase units per gram of unmalted cereal grains and the β-amylase enzyme is present in an amount equivalent to between about 8 and about 20 percent of malt by weight based on the weight of unmalted cereal grains.

3. A process as claimed in claim 1, wherein the α-amylase, amyloglucosidase and β-amylase enzymes are added in step (a).

4. A process as claimed in claim 1, wherein the α-amylase, amyloglucosidase and β-amylase enzymes are added during step (e).

5. A process as claimed in claim 1, wherein an adjunct is introduced into the mash in an amount between about 10 and about 60 percent by weight of unmalted cereal grains.

6. A process as claimed in claim 5, wherein the adjunct is liquefied cereal grains selected from liquefied corn grits, corn meal, sorghum, wheat flour, rice, cornstarch, barley flour and rice meal.

7. A process as claimed in claim 5, wherein the adjunct is a material selected from pregelatinized corn flakes, corn syrup and glucose.

8. A process for the production of beer or the like alcoholic beverage, wherein the wort obtained by the process of claim 1, after the addition of bittering adjuncts, is subjected to alcoholic fermentation.

9. In a process for the production of a brewer's wort in which an aqueous mash of unmalted cereal grains is subjected to the action of enzymes wherein proteins present in the unmalted cereal grains are converted into soluble nitrogen-containing compounds and carbohydrates present in the cereal grains are solubilized and converted by saccharification into sugars after which the resulting mash is filtered, the improvement of enhancing the filterability of the mash comprising:

(a) commingling an aqueous slurry of unmalted cereal grains with discrete protease enzyme in an amount effective to convert proteins present in the mash into soluble nitrogen-containing compounds for brewer's wort production but not less than 0.5 modified Kunitz protease units per gram of unmalted cereal grains;

(b) holding the mash at a temperature between about 40° and about 55° C. for between about 30 and about 240 minutes;

(c) raising the mash temperature to between about 65° and about 90° C.;

(d) adding discrete α-amylase enzyme prior to or at the beginning of step (c), the α-amylase being present in an amount effective to liquefy carbohydrates present in them ash for brewer's wort production but not less than 45 modified Stein-Fischer α-amylase units per gram of unmalted cereal grains;

(e) maintaining the mash temperature within the range defined in step (c) for between about 10 and about 90 minutes;

(f) cooling the mash to a temperature between about 40° and about 65° C.;

(g) commingling the mash with discrete amyloglucosidase enzyme and β-amylase enzyme or a source thereof, the amyloglucosidase being present in an amount effective to convert carbohydrates present in the mash into glucose for brewer's wort production but not less than $6.0\times10^{-3}$ amyloglucosidase units per gram of unmalted cereal grains, and the β-amylase being present in an amount equivalent to about 8 to about 30 percent of malt by weight based on the weight of unmalted cereal grains;

(h) maintaining the mash temperature within the range defined in step (f) for between about 30 and about 120 minutes; and (i) separating the wort so-obtained from the solid material.

10. A process as claimed in claim 9, wherein the protease enzyme is present in an amount of at least 0.9 modified Kunitz protease units per gram of unmalted cereal grains, the α-amylase enzyme is present in an amount of at least 100 modified Stein-Fischer α-amylase units per gram of unmalted cereal grains, the amyloglucosidase enzyme is present in an amount between about $1\times10^{-1}$ and about $10\times10^{-1}$ amyloglucosidase units per gram and the β-amylase enzyme is present in an amount equivalent to between about 8 and about 20 percent of malt by weight of unmalted cereal grains.

11. A process as claimed in claim 9, wherein the α-amylase enzyme is added in step (a).

12. A process as claimed in claim 9, wherein the α-amylase is added at the beginning of step (c).

13. A process as claimed in claim 9, wherein an adjunct is introduced into the mash in an amount between about 10 and about 60 percent by weight of unmalted cereal grains.

14. A process for the production of beer or the like alcoholic beverage, wherein the wort obtained by the process of claim 9, after the addition of bittering adjunctions, is subjected to alcoholic fermentation.

15. In a process for the production of a brewer's wort in which an aqueous mash of unmalted cereal grains is subjected to the action of enzymes whereby proteins present in the unmalted cereal grains are converted into soluble nitrogen-containing compounds and carbohydrates present in the cereal grains are solubilized and converted by saccharification into sugars after which the resulting mash is filtered, the improvement of enhancing the filterability of the mash comprising:

(a) commingling an aqueous slurry of unmalted cereal grains with discrete α-amylase enzyme in an amount effective to liquefy carbohydrates present in the mash for brewer's wort production but not less than 45 modified Stein-Fischer α-amylase units per gram of unmalted cereal grains;

(b) raising the temperature of the mash to between about 65° and about 90° C.;

(c) maintaining the mash temperature within the range defined in step (b) for between about 10 and about 90 minutes;

(d) cooling the mash to a temperature between about 40° and about 65° C.;

(e) commingling the mash with discrete protease, and amyloglucosidase enzymes and β-amylase enzyme or a source thereof, the protease being present in an amount effective to convert proteins present in the mash into soluble nitrogen-containing compounds for brewer's wort production but not less than 0.5 modified Kunitz protease units per gram of unmalted cereal grains, the amyloglucosidase being present in an amount effective to convert carbohydrates present in the mash into glucose for brewer's wort production but not less than $6.0\times10^{-3}$ amyloglucosidase units per gram of unmalted cereal grains, and the β-amylase being present in an amount equivalent to between about 8 and about 30 percent of malt by weight based on the weight of unmalted cereal grains;

(f) maintaining the mash temperature within the range defined in step (d) for between about 30 and about 240 minutes; and (g) separating the wort so-obtained from the solid material.

16. A process as claimed in claim 15, wherein the α-amylase enzyme is present in an amount of at least 100 modified Stein-Fischer α-amylase units per gram of unmalted cereal grains, the protease enzyme is present in an amount of at least 0.9 modified Kunitz protease units per gram of unmalted cereal grains, amylglucosidase enzyme is present in an amount between about $1\times10^{-1}$ and about $10\times10^{-1}$ amyloglucosidase units per gram of unmalted cereal grains and the β-amylase enzyme is present in an amount equivalent to between about 8 and about 20 percent of malt by weight based on the weight of unmalted cereal grains.

17. A process as claimed in claim 15, wherein an adjunction is introduced into the mash in an amount between about 10 and about 60 percent by weight of unmalted cereal grains.

18. A process for the production of beer or the like alcoholic beverage, wherein the wort obtained by the process of claim 15 after the addition of bittering adjuncts is subjected to alcoholic fermentation.

References Cited

UNITED STATES PATENTS

| | | | |
|---|---|---|---|
| 2,442,806 | 6/1948 | Gluek | 99—51 X |
| 2,790,718 | 4/1957 | Nugey | 99—52 X |
| 2,951,762 | 9/1960 | Nugey | 99—51 |
| 2,970,054 | 1/1961 | Nugey | 99—51 |
| 3,081,172 | 3/1963 | Dennis et al. | 99—51 |
| 3,137,639 | 6/1964 | Hurst et al. | 195—31 R |
| 3,353,960 | 11/1967 | Bavisotto | 99—52 |

FOREIGN PATENTS

| | | |
|---|---|---|
| 977,592 | 12/1964 | Great Britain. |

JOSEPH M. GOLIAN, Primary Examiner

U.S. Cl. X.R.

99—52